US012578554B2

(12) United States Patent
Fu et al.

(10) Patent No.: US 12,578,554 B2
(45) Date of Patent: Mar. 17, 2026

(54) OPTICAL IMAGING LENS ASSEMBLY

(71) Applicant: Zhejiang Sunny Optical Co., Ltd,
Yuyao (CN)

(72) Inventors: Leilei Fu, Yuyao (CN); Xujiong Wu,
Yuyao (CN); Qi Chen, Yuyao (CN);
Fujian Dai, Yuyao (CN); **Liefeng
Zhao**, Yuyao (CN)

(73) Assignee: Zhejiang Sunny Optical Co., Ltd
(CN)

( * ) Notice: Subject to any disclaimer, the term of this
patent is extended or adjusted under 35
U.S.C. 154(b) by 357 days.

(21) Appl. No.: 18/135,089

(22) Filed: Apr. 14, 2023

(65) Prior Publication Data

US 2024/0069308 A1 Feb. 29, 2024

(30) Foreign Application Priority Data

Aug. 30, 2022 (CN) .......................... 202211048102.1

(51) Int. Cl.
*G02B 13/00* (2006.01)
(52) U.S. Cl.
CPC ................................ *G02B 13/0045* (2013.01)
(58) Field of Classification Search
CPC ................................................. G02B 13/0045
See application file for complete search history.

(56) References Cited

U.S. PATENT DOCUMENTS

2022/0206254 A1* 6/2022 Wang ................. G02B 13/0045
2023/0176260 A1* 6/2023 Kim ....................... G02B 13/18
                                                    359/708
2025/0060564 A1* 2/2025 Jung ..................... G02B 13/00

FOREIGN PATENT DOCUMENTS

CN             112965215 A  *  6/2021  ............. H04N 23/00

OTHER PUBLICATIONS

CN-112965215-A, translation (Year: 2021).*

* cited by examiner

*Primary Examiner* — Wen Huang
(74) *Attorney, Agent, or Firm* — Barnes & Thornburg
LLP

(57) ABSTRACT

An optical imaging lens assembly, including: an imaging
lens group, consisting of a first lens, a second lens, a third
lens, a fourth lens, a fifth lens and a sixth lens arranged in
sequence from an object side to an image side along an
optical axis, where the sixth lens has at least one inflection
point on an image-side surface; a plurality of spacing
elements, including a first spacing element disposed
between the first lens and the second lens, a second spacing
element disposed between the second lens and the third lens,
a third spacing element disposed between the third lens and
the fourth lens and a fifth spacing element disposed between
the fifth lens and the sixth lens; and a lens barrel.

15 Claims, 8 Drawing Sheets

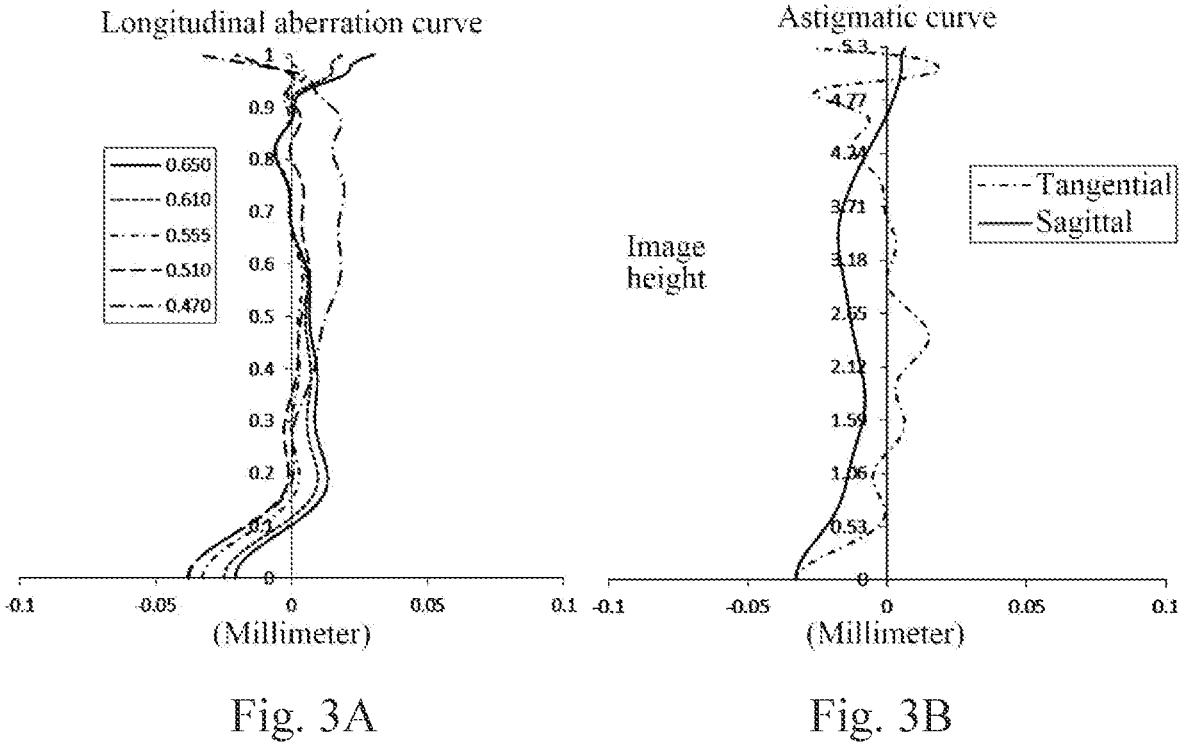
Fig. 3A
Fig. 3B
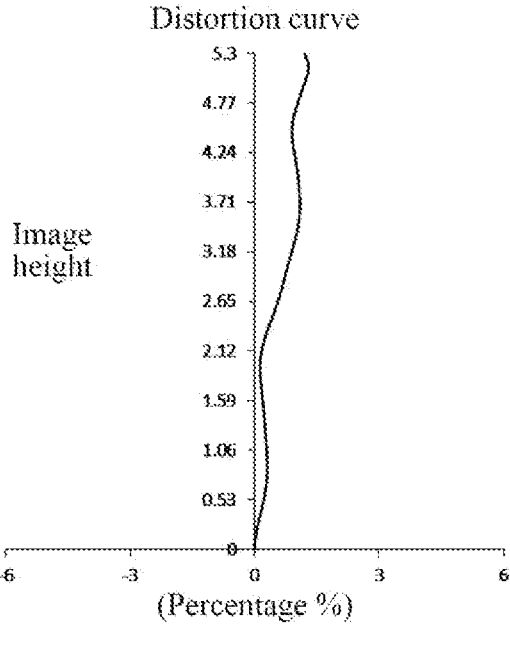
Fig. 3C

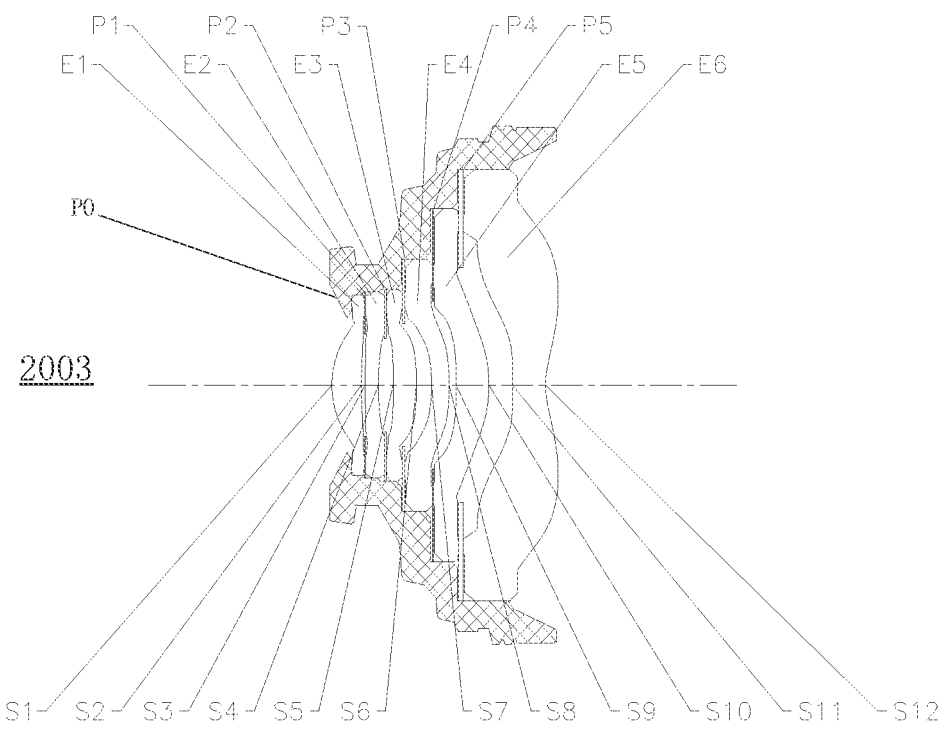
Fig. 4C
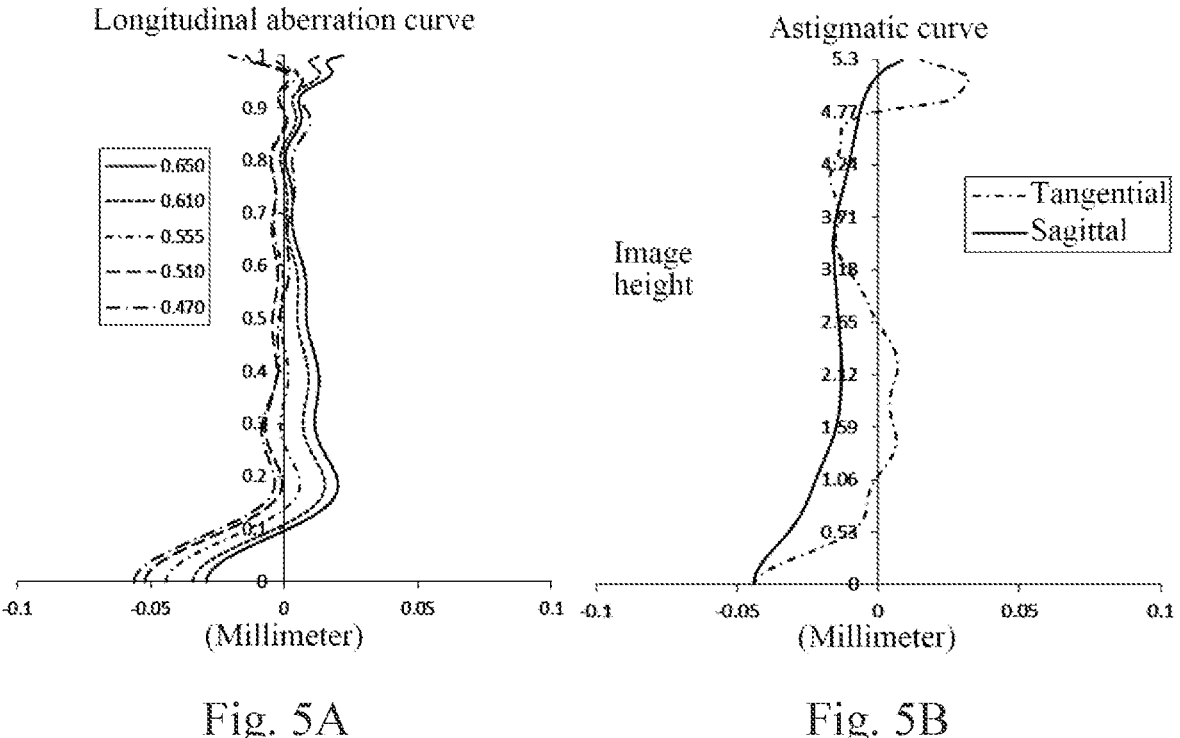
Fig. 5A                             Fig. 5B

Fig. 7A                                   Fig. 7B

OPTICAL IMAGING LENS ASSEMBLY

CROSS-REFERENCE TO RELATED APPLICATIONS

This application claims benefit of priority to Chinese Patent Application. No. 202211048102.1 filed on Aug. 30, 2022 before the China National Intellectual Property Administration, the entire disclosure of which is incorporated herein by reference in its entity.

TECHNICAL FIELD

The present disclosure relates to the field of optical elements, and in particular, to an optical imaging lens assembly.

BACKGROUND

In recent years, with vigorous development in the field of smart phones, major smartphone manufacturers have put forward more new requirements for mobile phone lens assemblies, especially on the main camera of high-end flagship models, imaging lens assemblies of mobile phones increasingly have a development trend towards large image plane, large wide angle, large aperture, and ultra-thin, which poses a more difficult challenge to the design of optical systems.

A large image plane indicates higher resolution; a large wide angle indicates a larger field-of-view; a large aperture represents more effective luminous flux and higher signal-to-noise ratio; ultra-thin may achieve better compatibility with smartphones and facilitates their portability. Compared with previous mobile phone lens assemblies, changes of these principal value parameters greatly improve an imaging ability and competitive advantage of the mobile phone lens assemblies.

SUMMARY

The present disclosure provides an optical imaging lens assembly, and the optical imaging lens assembly includes: an imaging lens group, consisting of a first lens, a second lens, a third lens, a fourth lens, a fifth lens and a sixth lens arranged in sequence from an object side to an image side along an optical axis, where the sixth lens has at least one inflection point on an image-side surface; a plurality of spacing elements, including a first spacing element disposed between the first lens and the second lens and in contact with an image-side surface of the first lens, a second spacing element disposed between the second lens and the third lens and in contact with an image-side surface of the second lens, a third spacing element disposed between the third lens and the fourth lens and in contact with an image-side surface of the third lens and a fifth spacing element disposed between the fifth lens and the sixth lens and in contact with an image-side surface of the fifth lens; and a lens barrel, for accommodating the imaging lens group and the plurality of spacing elements. An effective focal length f of the optical imaging lens assembly, a maximum thickness CP1 of the first spacing element along a direction of the optical axis, a spacing EP23 between an image-side surface of the second spacing element and an object-side surface of the third spacing element along the direction of the optical axis and a maximum thickness CP5 of the fifth spacing element along the direction of the optical axis satisfy: $5<f/(CP1+EP23+CP5)<11$.

In an implementation, an inner diameter d1s of an object-side surface of the first spacing element, an outer diameter D1s of the object-side surface of the first spacing element, a center thickness CT1 of the first lens on the optical axis, and an air spacing T12 between the first lens and the second lens on the optical axis satisfy: $126<(d1s \times D1s)/(CT1 \times T12)<148$.

In an implementation, a center thickness CT2 of the second lens on the optical axis, an air spacing T23 between the second lens and the third lens on the optical axis, and a spacing EP12 between an image-side surface of the first spacing element and an object-side surface of the second spacing element along the direction of the optical axis satisfy: $0.5<(CT2+T23)/EP12<3.5$.

In an implementation, the plurality of spacing elements further include a fourth spacing element disposed between the fourth lens and the fifth lens and in contact with the image-side surface of the fourth lens. An inner diameter d2s of an object-side surface of the second spacing element, an inner diameter d3s of the object-side surface of the third spacing element and an inner diameter dos of an object-side surface of the fourth spacing element satisfy: $d2s<d3s<d4s$.

In an implementation, at least two lenses of all lenses having an Abbe number greater than 40 in the imaging lens group have positive refractive powers.

In an implementation, at least one lens in the fourth lens to the sixth lens is a meniscus lens.

In an implementation, a radius of curvature R1 of an object-side surface of the first lens, a radius of curvature R2 of the image-side surface of the first lens, a radius of curvature R3 of an object-side surface of the second lens and a radius of curvature R4 of the image-side surface of the second lens satisfy: $R2>R1$ and $R3>R4$.

In an implementation, an effective focal length f2 of the second lens, a radius of curvature R4 of the image-side surface of the second lens, an inner diameter d2s of an object-side surface of the second spacing element and an inner diameter d2m of the image-side surface of the second spacing element satisfy: $16<|f2 \times R4|/(d2s \times d2m)<24$.

In an implementation, the plurality of spacing elements further include a fourth spacing element disposed between the fourth lens and the fifth lens and in contact with the image-side surface of the fourth lens. An effective focal length f4 of the fourth lens, a maximum thickness CP3 of the third spacing element along the direction of the optical axis, and a spacing EP34 between an image-side surface of the third spacing element and an object-side surface of the fourth spacing element along the direction of the optical axis satisfy: $12<|f4|/(CP3+EP34)<29$.

In an implementation, a radius of curvature R6 of the image-side surface of the third lens, a radius of curvature R7 of an object-side surface of the fourth lens, an inner diameter d3m of an image-side surface of the third spacing element and an outer diameter D3m of the image-side surface of the third spacing element satisfy: $1<|R6+R7|/(d3m+D3m)<18$.

In an implementation, a maximum thickness of the fifth spacing element along the direction of the optical axis is greater than maximum thicknesses of other spacing elements in the plurality of spacing elements along the direction of the optical axis.

In an implementation, the plurality of spacing elements further include a fourth spacing element disposed between the fourth lens and the fifth lens and in contact with an image-side surface of the fourth lens. The inner diameter d4s of the object-side surface of the fourth spacing element, an inner diameter d4m of an image-side surface of the fourth spacing element, an air spacing T45 between the fourth lens and the fifth lens on the optical axis satisfy: 16<(d4s+d4m)/T45<45.

In an implementation, the plurality of spacing elements further include a fourth spacing element disposed between the fourth lens and the fifth lens and in contact with an image-side surface of the fourth lens. An effective focal length f5 of the fifth lens and a spacing EP45 between an image-side surface of the fourth spacing element and an object-side surface of the fifth spacing element along the direction of the optical axis satisfy: 8<f5/EP45<11.

In an implementation, an inner diameter d0s of a front end surface of the lens barrel close to the object side, an inner diameter d0m of a rear end surface of the lens barrel close to the image side and the effective focal length f of the optical imaging lens assembly satisfy: 1<(d0s+d0m)/f<5.

In an implementation, an effective focal length f1 of the first lens, an effective focal length f2 of the second lens, and a spacing EP01 between a front end surface of the lens barrel close to the object side and an Object-side surface of the first spacing element along the direction of the optical axis satisfy: 11<|f1+f2|/EP01<16.

BRIEF DESCRIPTION OF THE DRAWINGS

Other features, objectives, and advantages of the present disclosure will become more apparent from the following detailed description of the non-limiting embodiments with reference to the accompanying drawings.

FIGS. 3A-3C respectively illustrate a longitudinal aberration curve, an astigmatic curve, and a distortion curve of the optical imaging lens assembly according to Embodiment 1 of the present disclosure;

FIGS. 4A-4C illustrate schematic structural diagrams of an optical imaging lens assembly according to Embodiment 2 of the present disclosure;

FIGS. 5A-5C respectively illustrate a longitudinal aberration curve, an astigmatic curve, and a distortion curve of the optical imaging lens assembly according to Embodiment 2 of the present disclosure;

FIGS. 7A-7C respectively illustrate a longitudinal aberration curve, an astigmatic curve, and a distortion curve of the optical imaging lens assembly according to Embodiment 3 of the present disclosure.

DETAILED DESCRIPTION OF EMBODIMENTS

Figure 1:
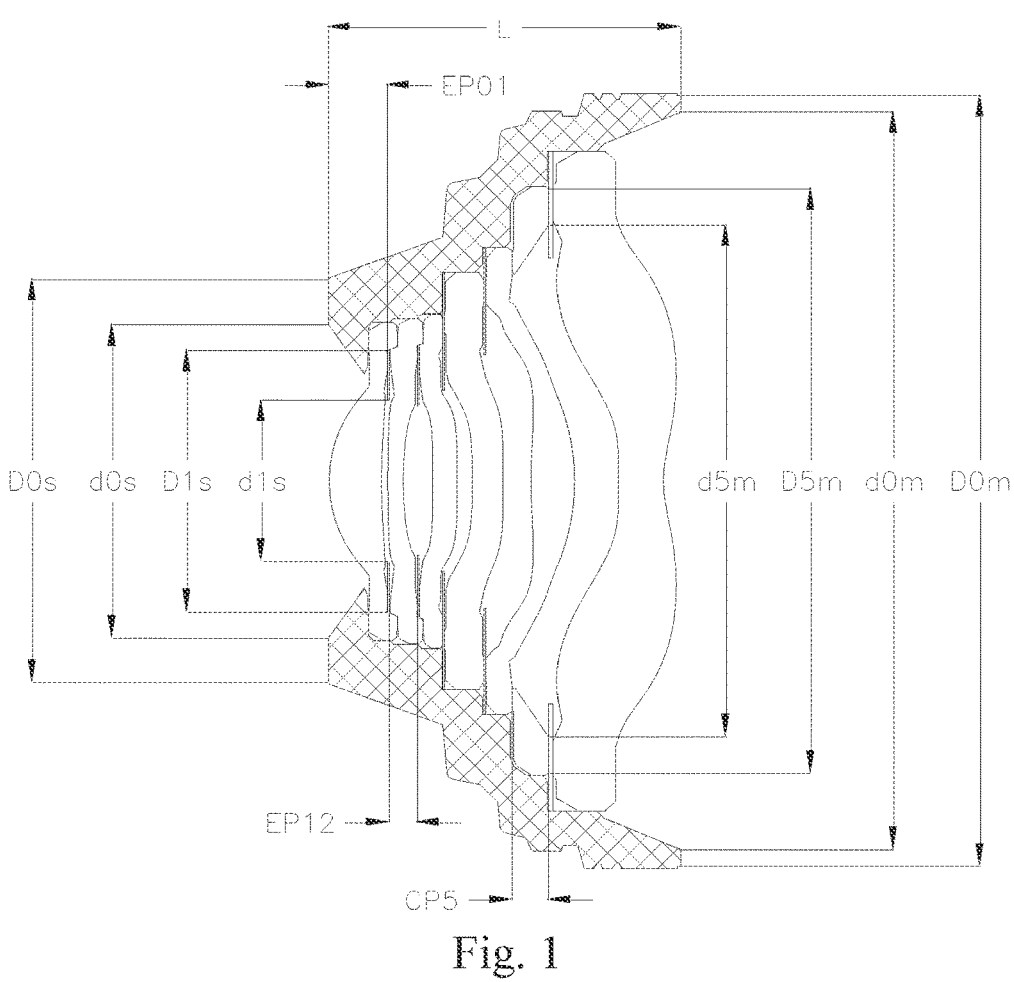
FIG. 1 illustrates a schematic diagram of a structural arrangement diagram and some parameters of an optical imaging lens assembly according to the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a curvature or a paraxial curvature refers to the curvature of an area near an optical axis. If the curvature of a lens surface is positive and the position of the curvature is not defined, it represents that the curvature of the lens surface is positive at least in the paraxial area. If the curvature of the lens surface is negative and the position of the curvature is not defined, it represents that the curvature of the lens surface is negative at least in the paraxial area. In each lens, a surface closest to a photographed object is referred to as an object-side surface of the lens, and a surface closest to an image plane is referred to as an image-side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The following embodiments express only several implementations of the present disclosure, and their descriptions are more specific and detailed, but they are not to be construed as a limitation to the scope of patent of the present disclosure. It should be noted that, for those of ordinary skill in the art, without departing from the concept of the present disclosure, a number of deformations and improvements can be made, which all fall within the scope of protection of the present disclosure. For example, a lens group (i.e., first lens to sixth lens), a lens barrel structure and spacing elements in each embodiment of the present disclosure may be combined with each other in any way, not limited to the lens group in an embodiment can only be combined with the lens barrel structure, the spacing elements, etc. in that embodiment.

The present disclosure will be described below in detail with reference to the accompanying drawings and in combination with the embodiments. FIG. 1 illustrates a schematic diagram of a structural arrangement diagram and some parameters of an optical imaging lens assembly according to the present disclosure. It should be understood by those skilled in the art that some parameters often used in the art, such as a center thickness CT1 of the first lens on the optical axis, are not shown in FIG. 1, which only exemplarily illustrates some of the parameters of a lens barrel and spacing elements of an optical imaging lens assembly of the present disclosure for a better understanding of the present disclosure. As shown in FIG. 1, L represents a maximum height of the lens barrel along the optical axis; EP01 represents a spacing between an front end surface of the lens barrel close to an object side and an object-side surface of a first spacing element along a direction of the optical axis; EP12 represents a spacing between an image-side surface of the first spacing element and an object-side surface of the second spacing element along the direction of the optical axis; CP5 represents a maximum thickness of a fifth spacing element along the direction of the optical axis; D1s represents an outer diameter of the object-side surface of the first spacing element; d1s represents an inner diameter of the object-side surface of the first spacing element; D0s represents an outer diameter of the front end surface of the lens barrel close to the object side; d0s represents an inner diameter of the front end surface of the lens barrel close to the object side; D5m represents an outer diameter of an image-side surface of the fifth spacing element; d5m represents an inner diameter of the image-side surface of the fifth spacing element; D0m represents an outer diameter of a rear end surface of the lens barrel close to an image side; and d0m represents an inner diameter of the rear end surface of the lens barrel close to the image side.

Features, principles and other aspects of the present disclosure are described below in detail.

An optical imaging lens assembly according to exemplary implementations of the present disclosure includes an imaging lens group and a plurality of spacing elements, where the imaging lens group along the optical axis from the object side to the image side sequentially includes: a first lens, a second lens, a third lens, a fourth lens, a fifth lens and a sixth lens. There may be a spacing distance between any two adjacent lenses in the first lens to the sixth lens. In the exemplary implementations, the optical imaging lens assembly further includes a lens barrel for accommodating the imaging lens group and the plurality of spacing elements.

In the exemplary implementations, the sixth lens has at least one inflection point on an image-side surface, which may avoid excessive divergence of light in an edge field-of-view, so that the system has a better coma aberration correction ability.

In the exemplary implementations, the first lens has a positive refractive power, the second lens has a negative refractive power, the third lens has a positive refractive power or a negative refractive power, the fourth lens has a negative refractive power, the fifth lens has a positive refractive power, and the sixth lens has a negative refractive power. By reasonably distributing the positive and negative refractive powers of the lenses of the optical imaging lens assembly, low-order aberrations of the optical imaging lens assembly may be effectively balanced and controlled, and sensitivity of a tolerance can be reduced, thereby maintaining miniaturization of the optical imaging lens assembly.

In the exemplary implementations, at least two lenses of all lenses having an Abbe number greater than 40 in the imaging lens group have positive refractive powers. By reasonably combining surface types and refractive powers of the lenses, it may be ensured that the lens assembly is ultra-thin under the premise of good processing feasibility of the lenses, providing a large space for the shape design of mobile phones and other electronic devices, at the same time may effectively ensure that a chief ray of the imaging system has a small incident angle when incident on the image plane, increasing a relative illumination, thus improving an imaging quality.

In the exemplary implementations, at least one lens in the fourth lens to the sixth lens is a meniscus lens. Different shapes of lens surfaces have different focal lengths and different processing effects on light. The imaging lens group is superposition of different lens surfaces, through focal length superposition of different lens surfaces, a certain imaging effect may be achieved. The meniscus lens may stably increase an imaging size, may effectively shorten an overall length of the lens assembly while ensuring good processability, realize characteristics of large image plane and ultra-thin of the lens assembly, and satisfy imaging needs of the lens assembly.

In the exemplary implementations, the plurality of spacing elements include the first spacing element disposed between the first lens and the second lens and in contact with an image-side surface of the first lens, the second spacing element disposed between the second lens and the third lens and in contact with an image-side surface of the second lens, a third spacing element disposed between the third lens and the fourth lens and in contact with an image-side surface of the third lens, a fourth spacing element disposed between the fourth lens and the fifth lens and in contact with an image-side surface of the fourth lens, and the fifth spacing element disposed between the fifth lens and the sixth lens and in contact with an image-side surface of the fifth lens.

In the exemplary implementations, the plurality of spacing elements include at least one of: the first spacing element disposed between the first lens and the second lens and in contact with an image-side surface of the first lens, the second spacing element disposed between the second lens and the third lens and in contact with an image-side surface of the second lens, the third spacing element disposed between the third lens and the fourth lens and in contact with an image-side surface of the third lens, the fourth spacing element disposed between the fourth lens and the fifth lens and in contact with an image-side surface of the fourth lens, or the fifth spacing element disposed between the fifth lens and the sixth lens and in contact with an image-side surface of the fifth lens.

It should be understood that the present disclosure does not specifically limit the number of spacing elements, may include any number of spacing elements between any two lenses, and the entire optical imaging lens assembly may also include any number of spacing elements. The spacing elements help the optical imaging lens assembly intercept excess refractive and reflective light paths, reduce stray light and ghosting. The addition of auxiliary support between the spacing elements and the lens barrel is conducive to improving the problems of poor assembly stability and low performance yield caused by large segment differences between the lenses.

In the exemplary implementations, the optical imaging lens assembly according to the present disclosure may satisfy: $5 < f/(CP1+EP23+CP5) < 11$, where f is an effective focal length of the optical imaging lens assembly, CP1 is a maximum thickness of the first spacing element along the direction of the optical axis, EP23 is a spacing between an image-side surface of the second spacing element and an object-side surface of the third spacing element along the direction of the optical axis, and CP5 is a maximum thickness of the fifth spacing element along the direction of the optical axis. Satisfying $5 < f/(CP1+EP23+CP5) < 11$ is conducive to ensuring the rationality of an overall structure of a large image plane lens assembly, effectively shortening the overall length of the lens assembly, realizing the characteristics of large image plane and ultra-thin, and also helps to further control the thickness of each spacing element, which can ensure a reasonable design of the center thickness and the air spacing of the lens assembly, and ensure good moldability and assembly stability of the lenses. In addition, reasonable use of the spacing elements between lenses may effectively reduce stray light, improve the imaging quality of the lens assembly, and improve the assembly stability of the lens assembly, thereby improving the performance yield.

In the exemplary implementations, the optical imaging lens assembly according to the present disclosure may satisfy: $126 < (d1s \times D1s)/(CT1 \times T12) < 148$, where, d1s is the inner diameter of the object-side surface of the first spacing element, D1s is the outer diameter of the object-side surface of the first spacing element, CT1 is the center thickness of the first lens on the optical axis, and T12 is an air spacing between the first lens and the second lens on the optical axis. Satisfying $126 < (d1s \times D1s)/(CT1 \times T12) < 148$, by controlling the inner diameter and the outer diameter of the object-side surface of the first spacing element, it may effectively block stray light, control a path of effective light emitted from the first lens and into the second lens, and at the same time effectively avoid interference along the direction of the optical axis between lenses after assembly of the first lens and the second lens, and is also conducive to reducing the assembly difficulty of the lens assembly and improving the processing feasibility of the lenses.

In the exemplary implementations, the optical imaging lens assembly according to the present disclosure may satisfy: $0.5 < (CT2+T23)/EP12 < 3.5$, where CT2 is a center thickness of the second lens on the optical axis, T23 is an air spacing between the second lens and the third lens on the optical axis, and EP12 is the spacing between the image-side surface of the first spacing element and the object-side surface of the second spacing element along the direction of the optical axis. Satisfying $0.5 < (CT2+T23)/EP12 < 3.5$ helps to control the thickness of the second lens close to the edge, and further helps to control a ratio of the edge thickness of the second lens to the center thickness of the second lens so that it is not too large, so as to ensure the molding of the second lens. At the same time, since the edge thickness of a lens being too thick may result in an increase in the reflective light path in the lens, it is not conducive to promotion and improvement of a lens shooting effect. Therefore, satisfying $0.5 < (CT2+T23)EP12 < 3.5$ is also conducive to satisfying the need of improving stray light in the optical imaging lens assembly.

In the exemplary implementations, the optical imaging lens assembly according to the present disclosure may satisfy: $d2s < d3s < d4s$, where d2s is an inner diameter of the object-side surface of the second spacing element, d3s is an inner diameter of the object-side surface of the third spacing element, and d4s is an inner diameter of an Object-side surface of the fourth spacing element. More specifically, d2s, d3s, and d4s may further satisfy: $2.0 \text{ mm} < d2s < d3s < d4s < 4.5$ mm. Satisfying $d2s < d3s < d4s$ is conducive to improving the assembly stability and the imaging quality of the optical imaging lens assembly. The inner diameter d2s of the object-side surface of the second spacing element, the inner diameter d3s of the object-side surface of the third spacing element, and the inner diameter d4s of the object-side surface of the fourth spacing element determine a degree to which these three spacing elements block a light path of each lens, effectively control a light propagation path, which may improve the imaging quality of the lens assembly. At the same time, the fourth spacing element is disposed against the image-side surface of the fourth lens, which plays a supporting positioning role and improves the assembly stability of the lens assembly.

In the exemplary implementations, the optical imaging lens assembly according to the present disclosure may satisfy: $R2 > R1$ and $R3 > R4$, where R1 is a radius of curvature of an object-side surface of the first lens, R2 is a radius of curvature of the image-side surface of the first lens, R3 is a radius of curvature of an object-side surface of the second lens, and R4 is a radius of curvature of the image-side surface of the second lens. More specifically, R1, R2, R3 and R4 may further satisfy: $R2 > R1 > 0$ and $R3 > R4 > 0$. Satisfying $R2 > R1$ and $R3 > R4$, and reasonably configuring the radii of curvature of the first lens, the second lens, the third lens and the fourth lens, may effectively realize its sharing of a large field-of-view on the object side, improve a correction ability of subsequent light groups to off-axis aberrations, and at the same time is conducive to ensuring that the chief ray angle (CRA) of the lens assembly is matched, and a field curvature of the lens assembly is corrected to satisfy imaging clarity requirements of each field-of-view, which may effectively eliminate spherical aberrations of the optical system and obtain high-definition images.

In the exemplary implementations, the optical imaging lens assembly according to the present disclosure may satisfy: $16 < |f2 \times R4|/(d2s \times d2m) < 24$, where f2 is an effective focal length of the second lens, R4 is the radius of curvature of the image-side surface of the second lens, d2s is the inner diameter of the object-side surface of the second spacing element, and d2m is an inner diameter of the image-side surface of the second spacing element. Satisfying $16 < |f2 \times R4|/(d2s \times d2m) < 24$ helps to control the shape and a stray light improvement effect of the second spacing element, and controlling the inner diameter d2s of the object-side surface of the second spacing element and the inner diameter d2m of the image-side surface of the second spacing element may effectively intercept stray light. At the same time, controlling the effective focal length f2 of the second lens and the radius of curvature R4 of the image-side surface of the second lens helps to improve the stray light improvement effect of the second spacing element, thereby improving the imaging quality of the lens assembly.

In the exemplary implementations, the optical imaging lens assembly according to the present disclosure may satisfy: $12 < |f4|/(CP3+EP34) < 29$, where f4 is an effective focal length of the fourth lens, CP3 is a maximum thickness of the third spacing element along the direction of the optical axis, and EP34 is a spacing between an image-side surface of the third spacing element and the object-side surface of the fourth spacing element along the direction of the optical axis. Satisfying $12 < |f4|/(CP3+EP34) < 29$ helps to control the thickness of the third lens close to the edge, and further helps to control a ratio of the edge thickness of the third lens to the center thickness of the third lens so that it is not too large, so as to ensure the molding of the third lens. At the same time, the effective focal length of the fourth lens is controlled to ensure an effective light path of ray emitted from the third lens and into the fourth lens, improving the imaging quality.

In the exemplary implementations, the optical imaging lens assembly according to the present disclosure may satisfy: $1<|R6+R7|/(d3m+D3m)<18$, where R6 is a radius of curvature of the image-side surface of the third lens, R7 is a radius of curvature of an object-side surface of the fourth lens, d3m is an inner diameter of the image-side surface of the third spacing element, and D3m is an outer diameter of the image-side surface of the third spacing element. Satisfying $1<|R6+R7|/(d3m+D3m)<18$ is conducive to ensuring the imaging quality and the assembly stability of the optical imaging lens assembly. The radius of curvature R6 of the image-side surface of the third lens determines the surface type of the image-side surface of the third lens, and the radius of curvature R7 of the object-side surface of the fourth lens determines the surface type of the image-side surface of the fourth lens, which jointly affect a light propagation path between the third lens and the fourth lens and ensure the imaging quality. The inner diameter d3m of the image-side surface of the third spacing element and the outer diameter D3m of the image-side surface of the third spacing element determine a contact area between the fourth lens and the third spacing element, and the larger the contact area between the two lenses, the better the assembly stability of the lens assembly.

In the exemplary implementations, the maximum thickness of the fifth spacing element along the direction of the optical axis is greater than maximum thicknesses of other spacing elements in the plurality of spacing elements along the direction of the optical axis. When a structural segment difference between the fifth lens and the sixth lens is large due to imaging requirements of the optical imaging lens assembly, the fifth spacing element disposed on the image-side surface of the fifth lens and in contact with the image-side surface of the fifth lens needs to have sufficient thickness to effectively avoid a risk of lens injection molding and assembly stability caused by the large structural segment difference between the fifth lens and the sixth lens, to promote and improve a lens assembly reliability and the moldability of the lenses.

In the exemplary implementations, the optical imaging lens assembly according to the present disclosure may satisfy: $16<(d4s+d4m)/T45<45$, where d4s is the inner diameter of the object-side surface of the fourth spacing element, d4m is an inner diameter of an image-side surface of the fourth spacing element, and T45 is an air spacing between the fourth lens and the fifth lens on the optical axis. Satisfying $16<(d4s+d4m)/T45<45$ is conducive to reducing stray light and improving the imaging quality. The inner diameter d4s of the object-side surface of the fourth spacing element and the inner diameter d4m of the image-side surface of the fourth spacing element jointly control the outermost path of light propagated between the fourth lens and the fifth lens, and the fourth spacing element may effectively block stray light. Controlling the air spacing T45 between the fourth lens and the fifth lens on the optical axis ensures a propagation distance of light between the lenses and satisfy the imaging requirements of the optical system.

In the exemplary implementations, the optical imaging lens assembly according to the present disclosure may satisfy: $8<f5/EP45<11$, where f5 is an effective focal length of the fifth lens, and EP45 is a spacing between the image-side surface of the fourth spacing element and an object-side surface of the fifth spacing element along the direction of the optical axis. Satisfying $8<f5/EP45<11$, and by controlling the spacing EP45 between the image-side surface of the fourth spacing element and the object-side surface of the fifth spacing element along the direction of the optical axis, it helps to control the edge thickness of the fifth lens, reduce molding difficulty of the fifth lens, and helps to improve internal reflective stray light of the fifth lens. At the same time, controlling the effective focal length f5 of the fifth lens helps to improve the stray light improvement effect, thereby improving the imaging quality of the lens assembly.

In the exemplary implementations, the optical imaging lens assembly according to the present disclosure may satisfy: $1<(d0s+d0m)/f<5$, where d0s is the inner diameter of the front end surface of the lens barrel close to the object side, d0m is the inner diameter of the rear end surface of the lens barrel close to the image side, and f is the effective focal length of the optical imaging lens assembly. Satisfying $1<(d0s+d0m)/f<5$ helps to control the appearance of the optical imaging lens assembly and ensure performance needs of the optical imaging lens assembly. By controlling the inner diameter d0s of the front end surface of the lens barrel and the inner diameter d0m of the rear end surface of the lens barrel, the outermost light of the effective light path may be effectively controlled to ensure that enough light enters the lens assembly and at the same time has a large enough imaging size. By controlling the effective focal length f of the optical imaging lens assembly, the imaging quality of the optical imaging lens assembly may be effectively improved.

In the exemplary implementations, the optical imaging lens assembly according to the present disclosure may satisfy: $11<|f1+f2|/EP01<16$, where f1 is an effective focal length of the first lens, f2 is the effective focal length of the second lens, and EP01 is the spacing between the front end surface of the lens barrel close to the object side and the object-side surface of the first spacing element along the direction of the optical axis. Satisfying $11<|f1+f2|/EP01<16$ is conducive to ensuring molding needs of the lenses and the lens barrel, by controlling the spacing EP01 between the front end surface of the lens barrel and the object-side surface of the first spacing element along the direction of the optical axis, it may control the edge thickness of the first lens and the thickness of the front end of the lens barrel, and reduce the molding difficulty. By constraining the focal length f1 of the first lens and the focal length f2 of the second lens, a range of incident light may be reasonably controlled, so that the optical imaging lens assembly has good optical performance.

In the exemplary implementations, a distance ID from the object-side surface of the first lens to the image-side surface of the sixth lens on the optical axis may be, for example, in a range of 5.1 mm to 5.4 mm.

In the exemplary implementations, half of a diagonal length ImgH of an effective pixel area on the image plane of the optical imaging lens assembly may be, for example, in a range of 5.0 mm to 5.5 mm, for example, ImgH is 5.29 mm.

In the exemplary implementations, the above optical imaging lens assembly may further include an optical filter for correcting color deviations and/or a protective glass for protecting a photosensitive element on the image plane. The optical imaging lens assembly according to the above implementations of the present disclosure may use a plurality of lenses, for example, the above six lenses. By reasonably distributing the refractive powers, the surface types of the lenses, the center thicknesses of the lenses and the axial spacing between the lenses, etc., it may effectively converge incident light, reduce a total track length of the imaging lens assembly and improve the processability of the imaging lens assembly, so that the optical imaging lens assembly is more conducive to production and processing.

In the implementations of the present disclosure, at least one of the surfaces of the lenses is an aspheric surface. That is, at least one of the surfaces from the object-side surface of the first lens to the image-side surface of the seventh lens is an aspheric surface. The aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and improving the astigmatic aberration. The use of the aspheric lens can eliminate as much as possible the aberrations that occur during the imaging, thereby improving the imaging quality. Alternatively, the object-side surface and the image-side surface of each of the first lens, the second lens, the third lens, the fourth lens, the fifth lens and the sixth lens are aspheric surfaces.

Specific embodiments of the optical imaging lens assembly that may be applicable to the above implementations are further described below with reference to the accompanying drawings.

Embodiment 1

An optical imaging lens assembly 1001, an optical imaging lens assembly 1002 and an optical imaging lens asseming lens group, and the imaging lens group from an object side to an image side sequentially including: a first lens E1, a second lens E2, a third lens E3, a fourth lens E4, a fifth lens E5, and a sixth lens E6, respectively. The first lens E1 has a positive refractive power, and has an object-side surface S1 and an image-side surface S2. The second lens E2 has a negative refractive power, and has an object-side surface S3 and an image-side surface S4. The third lens E3 has a positive refractive power, and has an object-side surface S5 and an image-side surface S6. The fourth lens E4 has a negative refractive power, and has an object-side surface S7 and an image-side surface S8. The fifth lens E5 has a positive refractive power, and has an object-side surface S9 and an image-side surface S10. The sixth lens E6 has a negative refractive power, and has an object-side surface S11 and an image-side surface S12. An optical filter E7 (not shown) has an object-side surface S13 (not shown) and an image-side surface S14 (not shown), light from an object sequentially passes through the surfaces S1 to S14 and finally forms an image on an image plane S15 (not shown).

Table 1 shows a table of basic parameters of the imaging lens group of the optical imaging lens assembly 1001, the optical imaging lens assembly 1002 and the optical imaging lens assembly 1003 in Embodiment 1. Here, the units of a radius of curvature, a thickness and an effective focal length are millimeters (mm).

TABLE 1

Figure 2A:
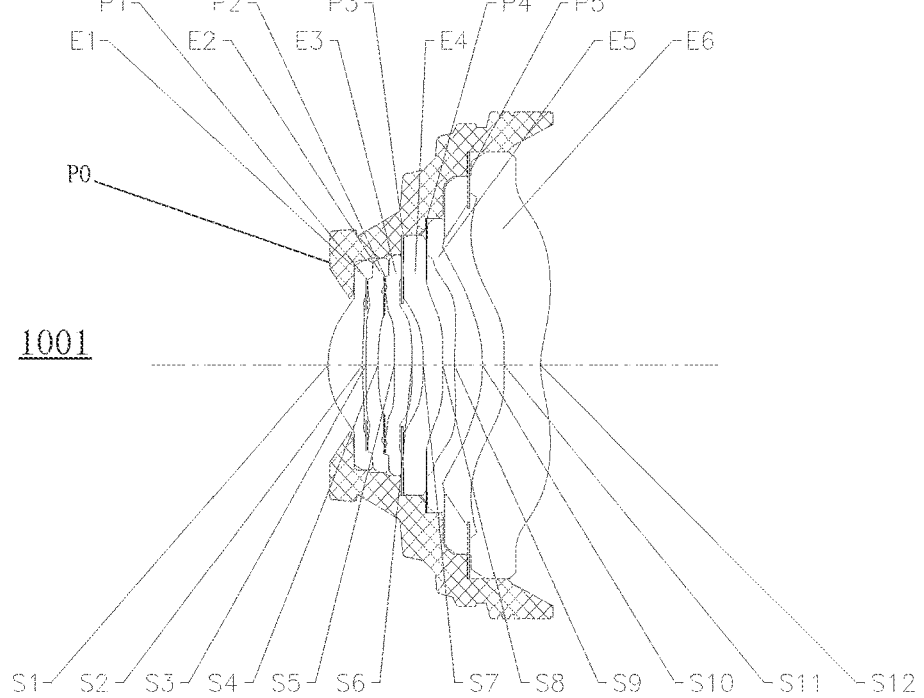
FIGS. 2A-2C illustrate schematic structural diagrams of an optical imaging lens assembly according to Embodiment 1 of the present disclosure.

| Surface number | Surface type | Radius of curvature | Thickness | Material Refractive index | Material Abbe number | Effective focal length | Conic coefficient |
|---|---|---|---|---|---|---|---|
| OBJ | spherical | infinite | infinite | | | | |
| STO | spherical | infinite | −0.5422 | | | | |
| S1 | aspheric | 2.0613 | 0.8663 | 1.54 | 56.1 | 4.95 | 0.0074 |
| S2 | aspheric | 7.4110 | 0.0920 | | | | 3.7742 |
| S3 | aspheric | 16.4270 | 0.2975 | 1.67 | 19.2 | −16.69 | 0.0000 |
| S4 | aspheric | 6.6480 | 0.4091 | | | | 3.2789 |
| S5 | aspheric | 30.0852 | 0.4402 | 1.54 | 56.1 | 35.55 | 0.0000 |
| S6 | aspheric | −54.4097 | 0.2857 | | | | 0.0000 |
| S7 | aspheric | −9.5910 | 0.4847 | 1.62 | 25.9 | −8.32 | 11.4219 |
| S8 | aspheric | 11.3701 | 0.2967 | | | | −6.7398 |
| S9 | aspheric | 5.6611 | 0.7053 | 1.54 | 56.1 | 4.14 | 0.1846 |
| S10 | aspheric | −3.6036 | 0.5195 | | | | 0.0799 |
| S11 | aspheric | 12.1994 | 0.9207 | 1.54 | 55.7 | −4.07 | 2.1093 |
| S12 | aspheric | 1.8047 | 0.4112 | | | | −1.0178 |
| S13 | spherical | infinite | 0.2100 | 1.52 | 64.2 | | |
| S14 | spherical | infinite | 0.6865 | | | | |
| S15 | spherical | infinite | | | | | | bly 1003 according to Embodiment 1 of the present disclosure is described below with reference to FIGS. 2A-3C. FIGS. 2A-2C respectively illustrate schematic structural diagrams of the optical imaging lens assembly 1001, the optical imaging lens assembly 1002 and the optical imaging lens assembly 1003 according to Embodiment 1 of the present disclosure.

Figure 2B:
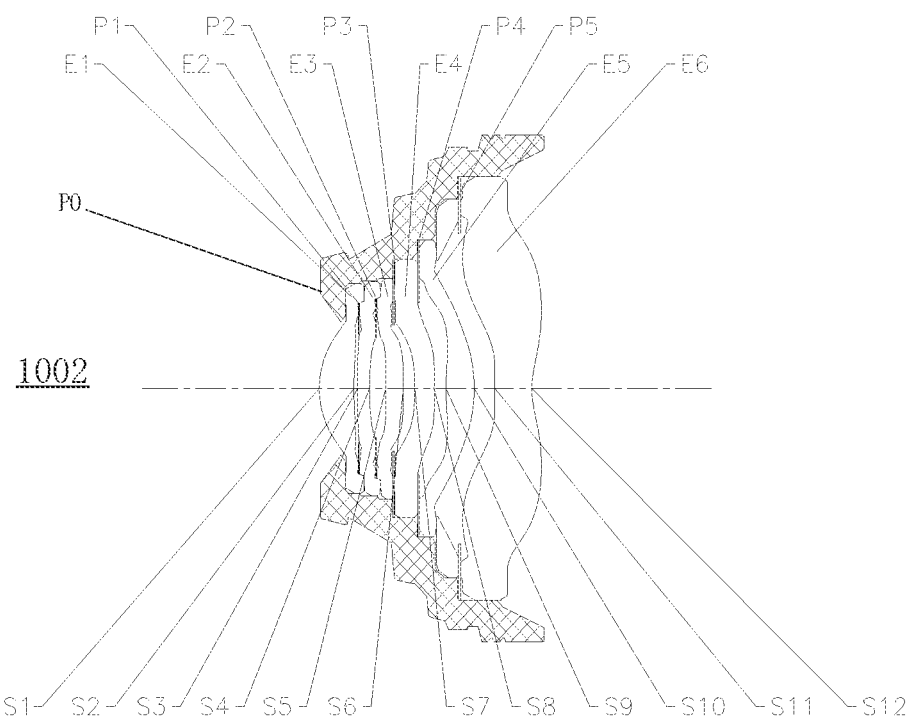
Figure 2C:
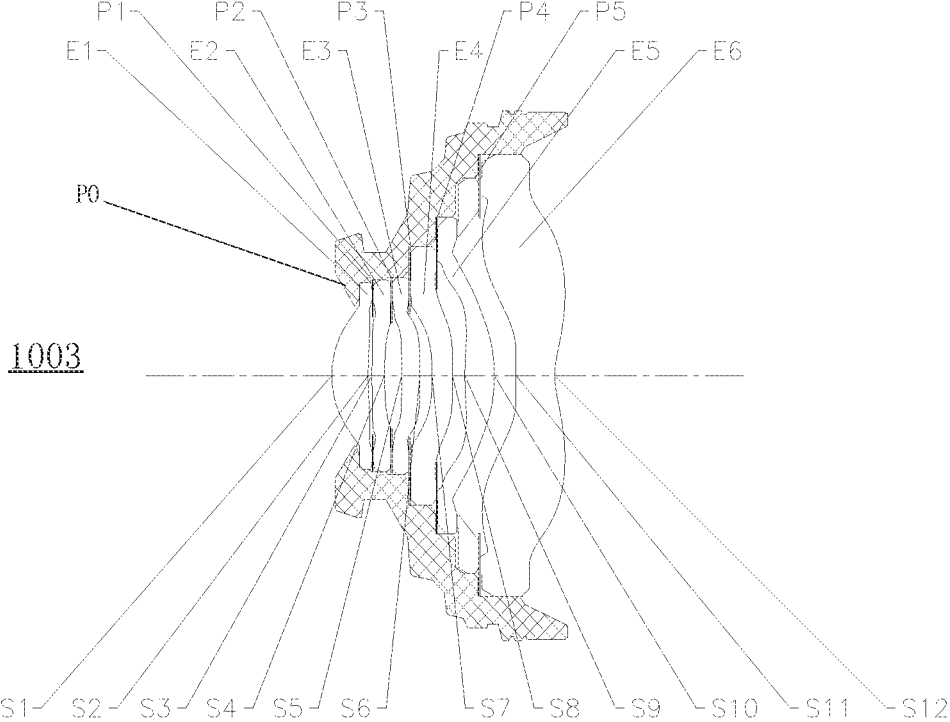

As shown in FIGS. 2A-2C, the optical imaging lens assembly 1001, the optical imaging lens assembly 1002 and the optical imaging lens assembly 1003 each include a lens barrel P0, an imaging lens group E1 to E6, and a plurality of spacing elements P1 to P5, respectively.

As shown in FIGS. 2A-2C, the optical imaging lens assembly 1001, the optical imaging lens assembly 1002 and the optical imaging lens assembly 1003 use the same imag- In this example, the optical imaging lens assembly 1001, the optical imaging lens assembly 1002 and the optical imaging lens assembly 1003 also have the following basic parameters: a distance TD from the object-side surface of the first lens to the image-side surface of the sixth lens on the optical axis is 5.32 mm, half of a diagonal length ImgH of an effective pixel area on the image plane of the optical imaging lens assembly is 5.29 mm, and an effective focal length f of the optical imaging lens assembly is 5.50 mm.

In Embodiment 1, the object-side surface and the image-side surface in the first lens E1 to the sixth lens E6 are aspheric surfaces, and the surface type x of each aspheric lens may be defined using, but not limited to, the following formula:

$$x = \frac{ch^2}{1 + \sqrt{1 + (k+1)c^2h^2}} + \sum Aih^i. \tag{1}$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of the i-th order of the aspheric surface. Table 2-1 and table 2-2 below give the high-order coefficients $A_4$, $A_6$, $A_8$, $A_{10}$, $A_{12}$, $A_{14}$, $A_{16}$, $A_{20}$, $A_{22}$, $A_{24}$, $A_{26}$, $A_{28}$ and $A_{30}$ applicable to the aspheric surfaces S1 to S12 in Embodiment 1.

and the fifth spacing element P5 is disposed between the fifth lens E5 and the sixth lens E6 and in contact with the image-side surface of the fifth lens E5.

The above plurality of spacing elements may block the entry of excess external light, so that the lenses and the lens barrel are better supported, and a structural stability of the optical imaging lens assembly 1001, the optical imaging lens assembly 1002 and the optical imaging lens assembly 1003 is enhanced.

Table 3 shows basic parameters of the spacing elements and the lens barrel of the optical imaging lens assembly 1001, the optical imaging lens assembly 1002 and the optical imaging lens assembly 1003 in Embodiment 1. The units of the parameters in Table 3 are millimeters (mm).

TABLE 2-1

| Surface number | A4 | A6 | A8 | A10 | A12 | A14 | A16 |
|---|---|---|---|---|---|---|---|
| S1 | −6.0552E−03 | 7.3113E−02 | −4.1680E−01 | 1.5157E+00 | −3.7001E+00 | 6.2722E+00 | −7.5379E+00 |
| S2 | −3.2801E−02 | −1.1725E−01 | 1.1008E+00 | −5.6829E+00 | 1.9338E+01 | −4.5355E+01 | 7.5321E+01 |
| S3 | −5.3518E−02 | 1.6497E−01 | −1.2913E+00 | 7.5916E+00 | −2.8683E+01 | 7.3579E+01 | −1.3259E+02 |
| S4 | −1.7700E−02 | 6.8857E−02 | −3.1582E−01 | 1.6636E+00 | −6.1489E+00 | 1.6898E+01 | −3.5678E+01 |
| S5 | −7.5976E−02 | 4.0155E−01 | −3.1880E+00 | 1.6295E+01 | −5.6875E+01 | 1.3954E+02 | −2.4573E+02 |
| S6 | −1.0063E−01 | 2.6276E−01 | −1.2114E+00 | 4.1858E+00 | −1.0664E+01 | 1.9929E+01 | −2.7445E+01 |
| S7 | −1.7966E−01 | 3.5563E−01 | −1.3686E+00 | 4.4457E+00 | −1.0400E+01 | 1.7450E+01 | −2.1264E+01 |
| S8 | −1.7681E−01 | 1.7532E−01 | −3.4583E−01 | 6.6154E−01 | −9.3214E−01 | 9.4530E−01 | −6.9437E−01 |
| S9 | −4.8915E−02 | −9.5253E−03 | 7.7279E−03 | 4.1132E−04 | 7.9664E−04 | −3.2248E−03 | 2.9372E−03 |
| S10 | −5.0207E−03 | −3.7031E−02 | 8.3940E−02 | −1.0443E−01 | 8.4724E−02 | −4.5244E−02 | 1.6277E−02 |
| S11 | −1.6418E−01 | 4.4596E−02 | 7.6309E−03 | −1.0091E−02 | 4.1078E−03 | −1.0465E−03 | 1.8688E−04 |
| S12 | −1.7178E−01 | 8.9921E−02 | −4.1148E−02 | 1.5024E−02 | −4.1405E−03 | 8.4309E−04 | −1.2635E−04 |

TABLE 2-2

| Surface number | A18 | A20 | A22 | A24 | A26 | A28 | A30 |
|---|---|---|---|---|---|---|---|
| S1 | 6.4852E+00 | −3.9914E+00 | 1.7352E+00 | −5.1765E−01 | 1.0020E−01 | −1.1251E−02 | 5.5107E−04 |
| S2 | −8.9877E+01 | 7.7298E+01 | −4.7474E+01 | 2.0300E+01 | −5.7387E+00 | 9.6368E−01 | −7.2757E−02 |
| S3 | 1.7074E+02 | −1.5784E+02 | 1.0389E+02 | −4.7501E+01 | 1.4336E+01 | −2.5673E+00 | 2.0661E−01 |
| S4 | 5.7682E+01 | −6.9847E+01 | 6.1467E+01 | −3.7811E+01 | 1.5325E+01 | −3.6645E+00 | 3.9096E−01 |
| S5 | 3.1380E+02 | −2.9059E+02 | 1.9288E+02 | −8.9267E+01 | 2.7298E+01 | −4.9456E+00 | 4.0089E−01 |
| S6 | 2.7827E+01 | −2.0611E+01 | 1.0963E+01 | −4.0577E+00 | 9.8761E−01 | −1.4142E−01 | 8.9811E−03 |
| S7 | 1.8959E+01 | −1.2357E+01 | 5.8210E+00 | −1.9292E+00 | 4.2653E−01 | −5.6448E−02 | 3.3798E−03 |
| S8 | 3.7075E−01 | −1.4333E−01 | 3.9594E−02 | −7.6095E−03 | 9.6617E−04 | −7.2874E−05 | 2.4738E−06 |
| S9 | −1.6206E−03 | 6.1537E−04 | −1.6035E−04 | 2.7816E−05 | −3.0548E−06 | 1.9187E−07 | −5.2502E−09 |
| S10 | −4.0354E−03 | 6.9727E−04 | −8.3631E−05 | 6.8013E−06 | −3.5572E−07 | 1.0705E−08 | −1.3916E−10 |
| S11 | −2.4190E−05 | 2.2842E−06 | −1.5580E−07 | 7.4735E−09 | −2.3910E−10 | 4.5795E−12 | −3.9718E−14 |
| S12 | 1.3924E−05 | −1.1226E−06 | 6.5309E−08 | −2.6650E−09 | 7.2306E−11 | −1.1706E−12 | 8.5539E−15 |

As shown in FIGS. 2A-2C, the optical imaging lens assembly 1001, the optical imaging lens assembly 1002 and the optical imaging lens assembly 1003 have a plurality of spacing elements including a first spacing element P1, a second spacing element P2, a third spacing element P3, a fourth spacing element P4 and a fifth spacing element P5 respectively. Here, the first spacing element P1 is disposed between the first lens E1 and the second lens E2 and in contact with the image-side surface of the first lens E1; the second spacing element P2 is disposed between the second lens E2 and the third lens E3 and in contact with the image-side surface of the second lens E2; the third spacing element P3 is disposed between the third lens E3 and the fourth lens E4 and in contact with the image-side surface of the third lens E3; the fourth spacing element P4 is disposed between the fourth lens E4 and the fifth lens E5 and in contact with the image-side surface of the fourth lens E4;

TABLE 3

| Embodiment parameter | Optical imaging lens assembly 1001 | Optical imaging lens assembly 1002 | Optical imaging lens assembly 1003 |
|---|---|---|---|
| d1s | 2.5994 | 2.5480 | 2.6413 |
| D1s | 3.9998 | 3.9782 | 4.2954 |
| d2s | 2.3483 | 2.3024 | 2.3640 |
| d2m | 2.3483 | 2.3024 | 2.3640 |
| d3s | 2.8862 | 2.9319 | 2.7815 |
| d3m | 2.8862 | 2.9319 | 2.7815 |
| D3m | 6.0873 | 6.0465 | 5.7842 |
| d4s | 3.9901 | 4.0249 | 3.8682 |
| d4m | 3.9901 | 4.0249 | 3.8682 |
| d0s | 4.5348 | 4.4453 | 4.5956 |
| d0m | 11.2596 | 11.2065 | 11.1966 |
| CP1 | 0.0279 | 0.0209 | 0.0180 |
| EP12 | 0.4191 | 0.4187 | 0.5289 |

TABLE 3-continued

| Embodiment parameter | Optical imaging lens assembly 1001 | Optical imaging lens assembly 1002 | Optical imaging lens assembly 1003 |
|---|---|---|---|
| CP2 | 0.0228 | 0.0208 | 0.0250 |
| EP23 | 0.4122 | 0.4142 | 0.4100 |
| CP3 | 0.0410 | 0.0310 | 0.0300 |
| EP34 | 0.5828 | 0.5928 | 0.6195 |
| CP4 | 0.0180 | 0.0230 | 0.0200 |
| EP45 | 0.4381 | 0.4331 | 0.4708 |
| CP5 | 0.5823 | 0.5523 | 0.5219 |
| EP01 | 0.9121 | 0.9336 | 0.8806 |

FIG. 3A illustrates a longitudinal aberration curve of the optical imaging lens assembly 1001, the optical imaging lens assembly 1002 and the optical imaging lens assembly 1003 according to Embodiment 1, representing deviations of focal points of light of different wavelengths converged after passing through the lens assembly. FIG. 3B illustrates an astigmatic curve of the optical imaging lens assembly 1001, the optical imaging lens assembly 1002 and the optical imaging lens assembly 1003 according to Embodiment 1, representing a curvature of a tangential image plane and a curvature of a sagittal image plane. FIG. 3C illustrates a distortion curve of the optical imaging lens assembly 1001, the optical imaging lens assembly 1002 and the optical imaging lens assembly 1003 in Embodiment 1, representing amounts of distortion corresponding to different image heights. It can be seen from FIGS. 3A-3C that the optical imaging lens assembly 1001, the optical imaging lens assembly 1002 and the optical imaging lens assembly 1003 given in Embodiment 1 can achieve a good imaging quality.

Embodiment 2

Figure 4A:
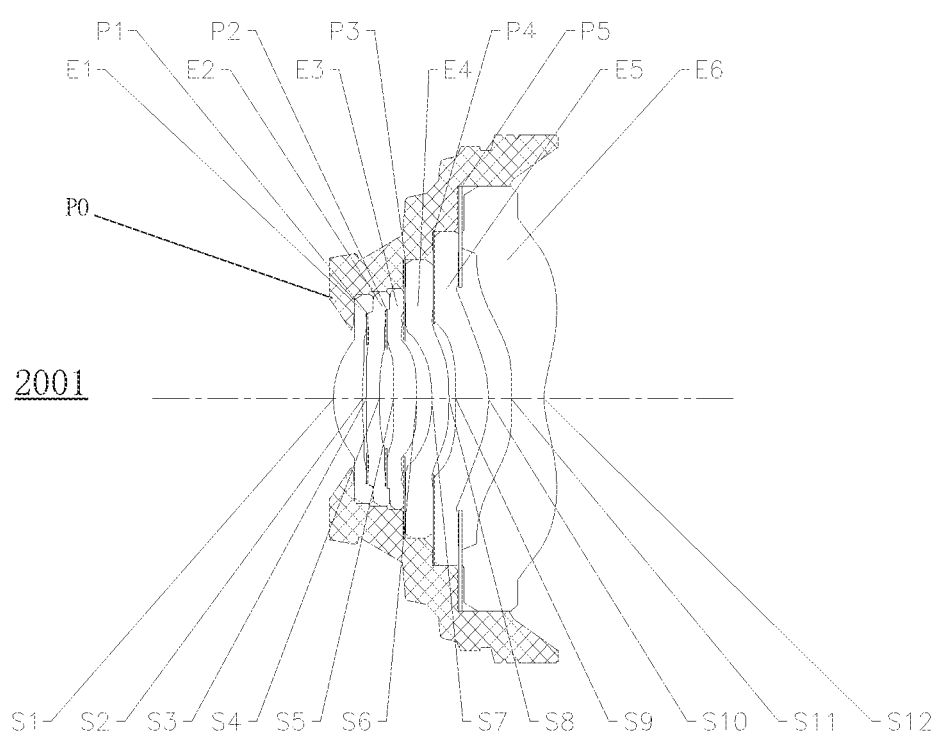
Figure 4B:
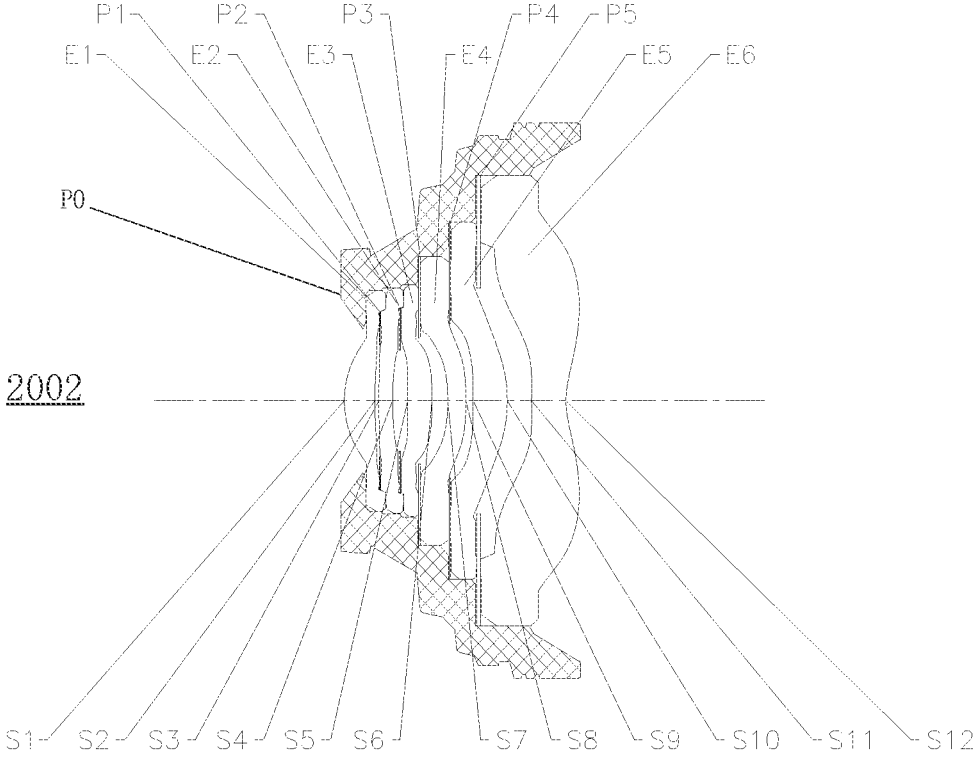

An optical imaging lens assembly 2001, an optical imaging lens assembly 2002 and an optical imaging lens assembly 2003 according to Embodiment 2 of the present disclosure is described below with reference to FIGS. 4A-5C. In this embodiment and the following embodiments, for the sake of brevity, some descriptions similar to those in Embodiment 1 will be omitted. FIGS. 4A-4C respectively illustrate schematic structural diagrams of the optical imaging lens assembly 2001, the optical imaging lens assembly 2002 and the optical imaging lens assembly 2003 according to Embodiment 2 of the present disclosure.

As shown in FIGS. 4A-4C, the optical imaging lens assembly 2001, the optical imaging lens assembly 2002 and the optical imaging lens assembly 2003 each include a lens barrel P0, an imaging lens group E1 to E6, and a plurality of spacing elements to P5, respectively.

As shown in FIGS. 4A-4C, the optical imaging lens assembly 2001, the optical imaging lens assembly 2002 and the optical imaging lens assembly 2003 use the same imaging lens group, and the imaging lens group from an object side to an image side sequentially including: a first lens E1, a second lens E2, a third lens E3, a fourth lens E4, a fifth lens E5, and a sixth lens E6, respectively. The first lens E1 has a positive refractive power, and has an object-side surface S1 and an image-side surface S2. The second lens E2 has a negative refractive power, and has an object-side surface S3 and an image-side surface S4. The third lens E3 has a positive refractive power, and has an object-side surface S5 and an image-side surface S6. The fourth lens E4 has a negative refractive power, and has an object-side surface S7 and an image-side surface S8. The fifth lens E5 has a positive refractive power, and has an object-side surface S9 and an image-side surface S10. The sixth lens E6 has a negative refractive power, and has an object-side surface S11 and an image-side surface S12. An optical filter E7 (not shown) has an object-side surface S13 (not shown) and an image-side surface S14 (not shown), light from an object sequentially passes through the surfaces S1 to S14 and finally forms an image on an image plane S15 (not shown).

In this example, the optical imaging lens assembly 2001, the optical imaging lens assembly 2002 and the optical imaging lens assembly 2003 also have the following basic parameters: a distance TD from the object-side surface of the first lens to the image-side surface of the sixth lens on the optical axis is 5.17 mm, half of a diagonal length ImgH of an effective pixel area on the image plane of the optical imaging lens assembly is 5.29 mm, and an effective focal length f of the optical imaging lens assembly is 5.10 mm.

Table 4 shows a table of basic parameters of the imaging lens group of the optical imaging lens assembly 2001, the optical imaging lens assembly 2002 and the optical imaging lens assembly 2003 in Embodiment 2. Here, the units of a radius of curvature, a thickness and an effective focal length are millimeters (mm). Table 5-1 and table 5-2 show the high-order coefficients applicable to the aspheric surfaces in Embodiment 2. Here, the surface type of each aspheric surface may be defined using the formula (1) given in Embodiment 1.

TABLE 4

| Surface number | Surface type | Radius of curvature | Thickness | Material Refractive index | Material Abbe number | Effective focal length | Conic coefficient |
|---|---|---|---|---|---|---|---|
| OBJ | spherical | infinite | infinite | | | | |
| STO | spherical | infinite | −0.4907 | | | | |
| S1 | aspheric | 2.0296 | 0.7141 | 1.54 | 56.1 | 4.79 | 0.0000 |
| S2 | aspheric | 7.9137 | 0.0940 | | | | 0.0000 |
| S3 | aspheric | 15.6883 | 0.3181 | 1.67 | 19.2 | −16.68 | 0.0000 |
| S4 | aspheric | 6.5144 | 0.3541 | | | | 0.0000 |
| S5 | aspheric | 29.4266 | 0.5664 | 1.54 | 56.1 | 14.02 | 0.0000 |
| S6 | aspheric | −10.2749 | 0.3683 | | | | 0.0000 |
| S7 | aspheric | −4.5085 | 0.4222 | 1.62 | 25.9 | −13.62 | 0.0000 |
| S8 | aspheric | −10.0335 | 0.1705 | | | | 0.0000 |
| S9 | aspheric | −66.7769 | 0.7959 | 1.54 | 56.1 | 6.19 | 0.0000 |
| S10 | aspheric | −3.2300 | 0.5642 | | | | 0.0000 |
| S11 | aspheric | 9.7068 | 0.8038 | 1.54 | 55.7 | −4.16 | 0.0000 |
| S12 | aspheric | 1.7651 | 0.5781 | | | | −1.0000 |
| S13 | spherical | infinite | 0.2100 | 1.52 | 64.2 | | |
| S14 | spherical | infinite | 0.3404 | | | | |
| S15 | spherical | infinite | | | | | |

TABLE 5-1

| Surface number | A4 | A6 | A8 | A10 | A12 | A14 | A16 |
|---|---|---|---|---|---|---|---|
| S1 | −9.0058E−03 | 1.3857E−01 | −1.0217E+00 | 4.7516E+00 | −1.4749E+01 | 3.1797E+01 | −4.8808E+01 |
| S2 | −3.0660E−02 | −1.6099E−01 | 1.7499E+00 | −9.8477E+00 | 3.5741E+01 | −8.8764E+01 | 1.5580E+02 |
| S3 | −6.7500E−02 | 2.9353E−01 | −2.2046E+00 | 1.2042E+01 | −4.3751E+01 | 1.0998E+02 | −1.9646E+02 |
| S4 | −1.1842E−02 | −1.5932E−01 | 2.1233E+00 | −1.4373E+01 | 6.4574E+01 | −2.0117E+02 | 4.4488E+02 |
| S5 | −7.0564E−02 | 3.9279E−01 | −4.0015E+00 | 2.5055E+01 | −1.0534E+02 | 3.0919E+02 | −6.4911E+02 |
| S6 | −5.2039E−02 | −8.1744E−02 | 5.3194E−01 | −2.5878E+00 | 8.2545E+00 | −1.8249E+01 | 2.8830E+01 |
| S7 | −8.0329E−02 | 1.0190E−01 | −7.6157E−01 | 3.3696E+00 | −9.6880E+00 | 1.9218E+01 | −2.7136E+01 |
| S8 | −9.2254E−02 | −3.9432E−02 | 2.6163E−01 | −6.8800E−01 | 1.3044E+00 | −1.7884E+00 | 1.7791E+00 |
| S9 | −7.2249E−02 | 1.4588E−02 | −1.5058E−01 | 7.4509E−01 | −1.8454E+00 | 2.9230E+00 | −3.1804E+00 |
| S10 | −2.4102E−02 | 6.2114E−03 | 1.9047E−02 | −2.9665E−02 | 3.0328E−02 | −2.1085E−02 | 1.0027E−02 |
| S11 | −1.5262E−01 | 4.4138E−02 | 6.6808E−03 | −1.2506E−02 | 6.2708E−03 | −1.8941E−03 | 3.8847E−04 |
| S12 | −1.5000E−01 | 6.5774E−02 | −2.3351E−02 | 6.3124E−03 | −1.2713E−03 | 1.8749E−04 | −1.9839E−05 |

TABLE 5-2

| Surface number | A18 | A20 | A22 | A24 | A26 | A28 | A30 |
|---|---|---|---|---|---|---|---|
| S1 | 5.4041E+01 | −4.3256E+01 | 2.4788E+01 | −9.9124E+00 | 2.6263E+00 | −4.1427E−01 | 2.9448E−02 |
| S2 | −1.9657E+02 | 1.7906E+02 | −1.1677E+02 | 5.3175E+01 | −1.6063E+01 | 2.8926E+00 | −2.3509E−01 |
| S3 | 2.5269E+02 | −2.3439E+02 | 1.5515E+02 | −7.1367E+01 | 2.1636E+01 | −3.8799E+00 | 3.1113E−01 |
| S4 | −7.0663E+02 | 8.0713E+02 | −6.5605E+02 | 3.6963E+02 | −1.3698E+02 | 2.9979E+01 | −2.9305E+00 |
| S5 | 9.8683E+02 | −1.0881E+03 | 8.6125E+02 | −4.7680E+02 | 1.7524E+02 | −3.8406E+01 | 3.7988E+00 |
| S6 | −3.3057E+01 | 2.7602E+01 | −1.6618E+01 | 7.0246E+00 | −1.9766E+00 | 3.3209E−01 | −2.5166E−02 |
| S7 | 2.7704E+01 | −2.0510E+01 | 1.0908E+01 | −4.0625E+00 | 1.0059E+00 | −1.4874E−01 | 9.9360E−03 |
| S8 | −1.2921E+00 | 6.8408E−01 | −2.6063E−01 | 6.9424E−02 | −1.2239E−02 | 1.2800E−03 | −6.0005E−05 |
| S9 | 2.4420E+00 | −1.3346E+00 | 5.1610E−01 | −1.3796E−01 | 2.4235E−02 | −2.5158E−03 | 1.1685E−04 |
| S10 | −3.3684E−03 | 8.1900E−04 | −1.4492E−04 | 1.8318E−05 | −1.5708E−06 | 8.1787E−08 | −1.9455E−09 |
| S11 | −5.6409E−05 | 5.8839E−06 | −4.3934E−07 | 2.2969E−08 | −7.9990E−10 | 1.6692E−11 | −1.5808E−13 |
| S12 | 1.4521E−06 | −6.7341E−08 | 1.4051E−09 | 3.3887E−11 | −3.1594E−12 | 8.4312E−14 | −8.3870E−16 |

As shown in FIGS. 4A-4C, the optical imaging lens assembly 2001, the optical imaging lens assembly 2002 and the optical, imaging lens assembly 2003 have a plurality of spacing elements including a first spacing element P1, a second spacing element P2, a third spacing element P3, a fourth spacing element P4 and a fifth spacing element P5 respectively. Here, the first spacing element P1 is disposed between the first lens E1 and the second lens E2 and in contact with the image-side: surface of the first lens E1; the second spacing element P2 is disposed between the second lens E2 and the third lens E3 and in contact with the image-side surface of the second lens E2; the third spacing element P3 is disposed between the third lens E3 and the fourth lens E4 and in contact with the image-side surface of the third lens E3; the fourth spacing element P4 is disposed between the fourth lens E4 and the fifth lens E5 and in contact with the image-side surface of the fourth lens E4; and the fifth spacing element P5 is disposed between the fifth lens E5 and the sixth lens E6 and in contact with the image-side surface of the fifth lens E5. The above plurality of spacing elements may block the entry of excess external light, so that the lenses and the lens barrel are better supported, and a structural stability of the optical imaging lens assembly 2001, the optical imaging lens assembly 2002 and the optical imaging lens assembly 2003 is enhanced.

Table 6 shows basic parameters of the spacing elements and the lens barrel of the optical imaging lens assembly 2001, the optical imaging lens assembly 2002 and the optical imaging lens assembly 2003 in Embodiment 2. The units of the parameters in Table 6 are millimeters (mm).

TABLE 6

| Embodiment parameter | Optical imaging lens assembly 2001 | Optical imaging lens assembly 2002 | Optical imaging lens assembly 2003 |
|---|---|---|---|
| d1s | 2.5075 | 2.4624 | 2.3254 |
| D1s | 3.9247 | 3.8955 | 4.2527 |
| d2s | 2.2993 | 2.2139 | 2.1305 |
| d2m | 2.2993 | 2.2139 | 2.1305 |
| d3s | 2.6754 | 2.7603 | 2.7971 |
| d3m | 2.6754 | 2.7603 | 2.7971 |
| D3m | 6.4211 | 6.3266 | 5.7415 |
| d4s | 3.4729 | 3.3957 | 3.8254 |
| d4m | 3.4729 | 3.3957 | 3.8254 |
| d0s | 4.6638 | 4.5106 | 4.6188 |
| d0m | 11.5933 | 11.4701 | 11.1826 |
| CP1 | 0.0280 | 0.0190 | 0.0254 |
| EP12 | 0.4381 | 0.4472 | 0.4619 |
| CP2 | 0.0354 | 0.0279 | 0.0384 |
| EP23 | 0.4099 | 0.4173 | 0.3868 |
| CP3 | 0.0380 | 0.0456 | 0.0641 |
| EP34 | 0.6890 | 0.6814 | 0.6630 |
| CP4 | 0.0222 | 0.0286 | 0.0396 |
| EP45 | 0.6118 | 0.6053 | 0.5956 |
| CP5 | 0.0658 | 0.0907 | 0.1202 |
| EP01 | 0.9146 | 0.8927 | 0.8376 |

Figure 5C:
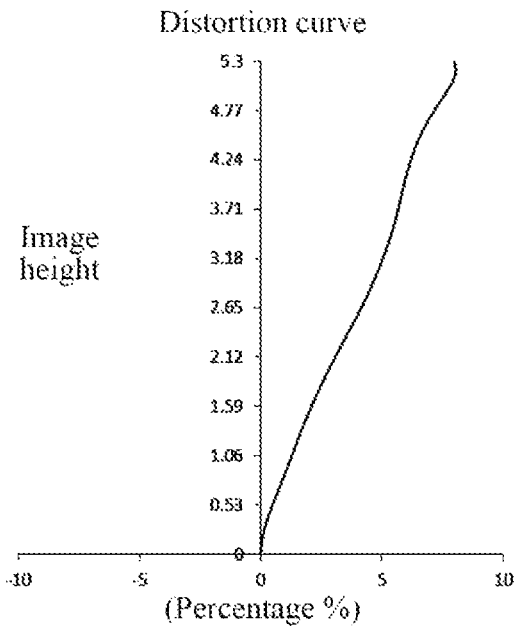

FIG. 5A illustrates a longitudinal aberration curve of the optical imaging lens assembly 2001, the optical imaging lens assembly 2002 and the optical imaging lens assembly 2003 according to Embodiment 2, representing deviations of focal points of light of different wavelengths converged after passing through the lens assembly. FIG. 5B illustrates an astigmatic curve of the optical imaging lens assembly 2001, the optical imaging lens assembly 2002 and the optical imaging lens assembly 2003 according to Embodiment 2, representing a curvature of a tangential image plane and a curvature of a sagittal image plane. FIG. 5C illustrates a distortion curve of the optical imaging lens assembly 2001, the optical imaging lens assembly 2002 and the optical imaging lens assembly 2003 in Embodiment 2, representing amounts of distortion corresponding to different image heights. It can be seen from FIGS. 5A-5C that the optical imaging lens assembly 2001, the optical imaging lens assembly 2002 and the optical imaging lens assembly 2003 given in Embodiment 2 can achieve a good imaging quality.

Embodiment 3

Figure 6A:
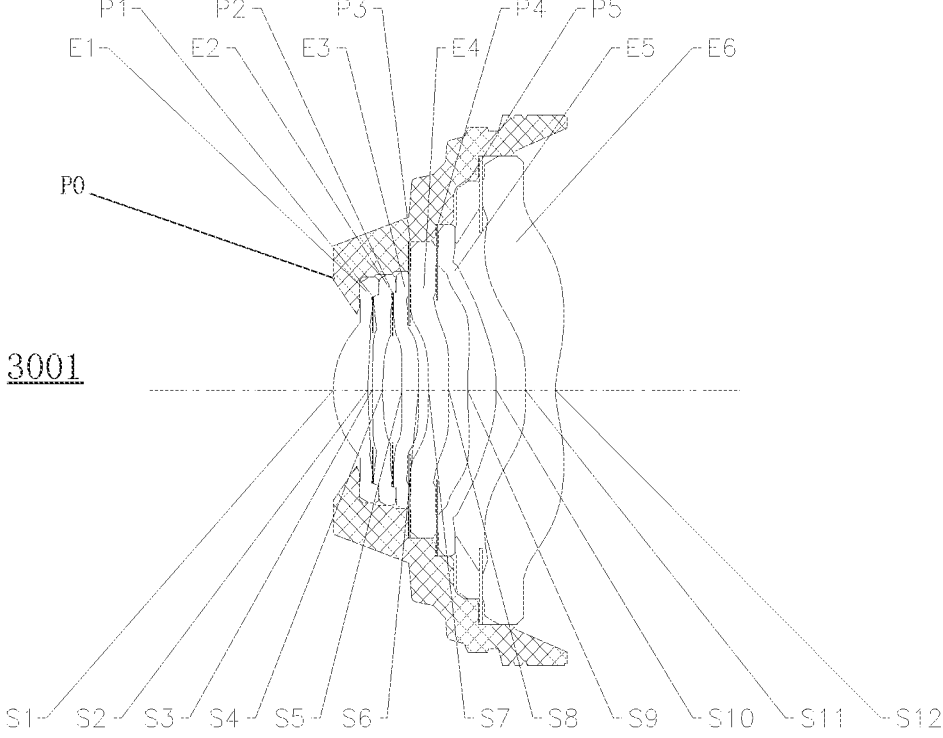
FIGS. 6A-6C illustrate schematic structural diagrams of an optical imaging lens assembly according to Embodiment 3 of the present disclosure.
Figure 6B:
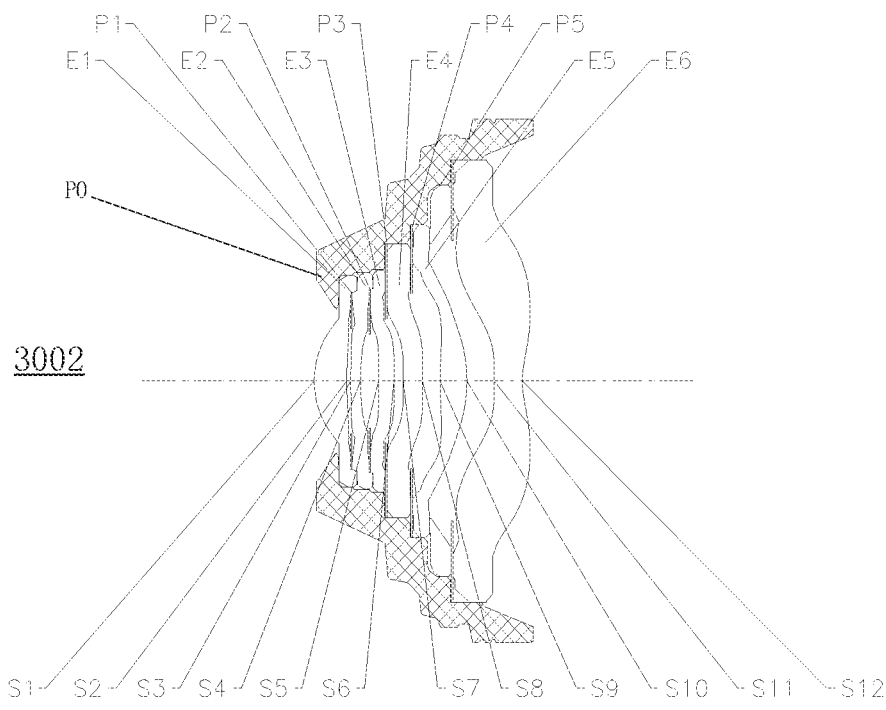
Figure 6C:
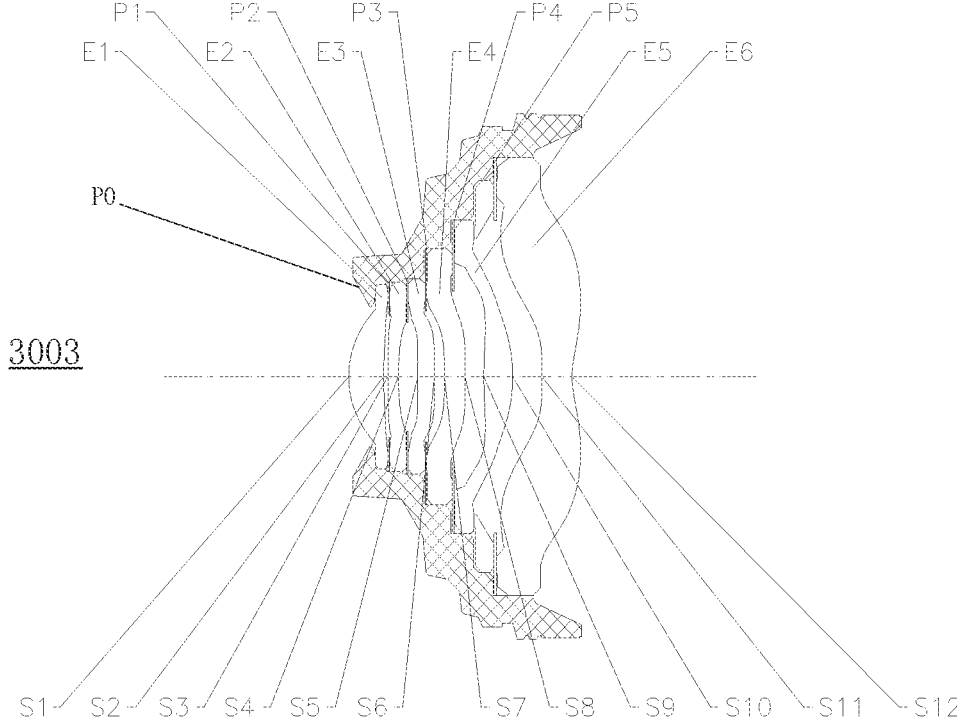

An optical imaging lens assembly 3001, an optical imaging lens assembly 3002 and an optical imaging lens assembly 3003 according to Embodiment 3 of the present disclosure is described below with reference to FIGS. 6A-7C. FIGS. 6A-6C respectively illustrate schematic structural diagrams of the optical imaging lens assembly 3001, the optical imaging lens assembly 3002 and the optical imaging lens assembly 3003 according to Embodiment 3 of the present disclosure.

As shown in FIGS. 6A-6C, the optical imaging lens assembly 3001, the optical imaging lens assembly 3002 and the optical imaging lens assembly 3003 each include a lens barrel P0, an imaging lens group E1 to E6, and a plurality of spacing elements P1 to P5, respectively.

As shown in FIGS. 6A-6C, the optical imaging lens assembly 3001, the optical imaging lens assembly 3002 and the optical imaging lens assembly 3003 use the same imaging lens group, and the imaging lens group from an object side to an image side sequentially including: a first lens E1, a second lens E2, a third lens E3, a fourth lens E4, a fifth lens E5, and a sixth lens E6, respectively. The first lens E1 has a positive refractive power, and has an object-side surface S1 and an image-side surface S2. The second lens E2 has a negative refractive power, and has an object-side surface S3 and an image-side surface S4. The third lens E3 has a negative refractive power, and has an object-side surface S5 and an image-side surface S6. The fourth lens E4 has a negative refractive power, and has an object-side surface S7 and an image-side surface S8. The fifth lens E5 has a positive refractive power, and has an object-side surface S9 and an image-side surface S10. The sixth lens E6 has a negative refractive power, and has an object-side surface S11 and an image-side surface S12. An optical filter E7 (not shown) has an object-side surface S13 (not shown) and an image-side surface S14 (not shown), light from an object sequentially passes through the surfaces S1 to S14 and finally forms an image on an image plane S15 (not shown).

In this example, the optical imaging lens assembly 3001, the optical imaging lens assembly 3002 and the optical imaging lens assembly 3003 also have the following basic parameters: a distance TD from the object-side surface of the first lens to the image-side surface of the sixth lens on the optical axis is 5.37 mm, half of a diagonal length ImgH of an effective pixel area on the image plane of the optical imaging lens assembly is 5.29 mm, and an effective focal length f of the optical imaging lens assembly is 5.50 mm.

Table 7 shows a table of basic parameters of the imaging lens group of the optical imaging lens assembly 3001, the optical imaging lens assembly 3002 and the optical imaging lens assembly 3003 in Embodiment 3. Here, the units of a radius of curvature, a thickness and an effective focal length are millimeters (mm). Table 8-1 and table 8-2 show the high-order coefficients applicable to the aspheric surfaces in Embodiment 3. Here, the surface type of each aspheric surface may be defined using the formula (1) given in Embodiment 1.

TABLE 7

| Surface number | Surface type | Radius of curvature | Thickness | Material Refractive index | Material Abbe number | Effective focal length | Conic coefficient |
|---|---|---|---|---|---|---|---|
| OBJ | spherical | infinite | infinite | | | | |
| STO | spherical | infinite | −0.5448 | | | | |
| S1 | aspheric | 2.0830 | 0.8384 | 1.54 | 56.1 | 5.03 | 0.0529 |
| S2 | aspheric | 7.3901 | 0.1027 | | | | 7.9120 |
| S3 | aspheric | 13.1650 | 0.2520 | 1.67 | 19.2 | −16.51 | 0.0000 |
| S4 | aspheric | 6.0006 | 0.4694 | | | | 1.9697 |
| S5 | aspheric | 39.8764 | 0.3960 | 1.54 | 56.1 | −516.54 | 0.0000 |
| S6 | aspheric | 34.8137 | 0.2411 | | | | 0.0000 |
| S7 | aspheric | 119.0344 | 0.4901 | 1.62 | 25.9 | −18.78 | −98.1121 |
| S8 | aspheric | 10.5807 | 0.4546 | | | | 0.0638 |
| S9 | aspheric | 6.5778 | 0.6938 | 1.54 | 56.1 | 4.60 | 0.6925 |
| S10 | aspheric | −3.9146 | 0.7021 | | | | 0.1519 |
| S11 | aspheric | 19.6890 | 0.7264 | 1.54 | 55.7 | −3.93 | 6.2249 |
| S12 | aspheric | 1.8845 | 0.3616 | | | | −1.0120 |
| S13 | spherical | infinite | 0.2100 | 1.52 | 64.2 | | |
| S14 | spherical | infinite | 0.6417 | | | | |
| S15 | spherical | infinite | | | | | |

TABLE 8-1

| Surface number | A4 | A6 | A8 | A10 | A12 | A14 | A16 |
|---|---|---|---|---|---|---|---|
| S1 | −3.1547E−03 | 4.5705E−02 | −2.7368E−01 | 1.0784E+00 | −2.8641E+00 | 5.2767E+00 | −6.8884E+00 |
| S2 | −2.6534E−02 | −1.2995E−01 | 1.2163E+00 | −6.4070E+00 | 2.2171E+01 | −5.2781E+01 | 8.8894E+01 |
| S3 | −5.1195E−02 | 1.5435E−01 | −1.1816E+00 | 6.7944E+00 | −2.5107E+01 | 6.2995E+01 | −1.1102E+02 |
| S4 | −2.0286E−02 | 1.0914E−01 | −8.1668E−01 | 5.3574E+00 | −2.3851E+01 | 7.4733E+01 | −1.6831E+02 |

TABLE 8-1-continued

| Surface number | A4 | A6 | A8 | A10 | A12 | A14 | A16 |
|---|---|---|---|---|---|---|---|
| S5 | −6.6690E−02 | 3.3023E−01 | −2.4563E+00 | 1.1763E+01 | −3.8465E+01 | 8.8419E+01 | −1.4588E+02 |
| S6 | −9.0866E−02 | 2.2545E−01 | −9.8762E−01 | 3.2429E+00 | −7.8504E+00 | 1.3941E+01 | −1.8243E+01 |
| S7 | −1.4484E−01 | 2.2278E−01 | −7.2517E−01 | 2.0538E+00 | −4.3417E+00 | 6.7075E+00 | −7.6188E+00 |
| S8 | −1.3474E−01 | 1.2760E−01 | −2.0957E−01 | 3.2208E−01 | −3.8631E−01 | 3.4274E−01 | −2.2112E−01 |
| S9 | −5.7121E−02 | 3.1742E−02 | −1.9489E−02 | −6.5133E−04 | 1.7697E−02 | −2.0153E−02 | 1.2663E−02 |
| S10 | −3.7363E−02 | 2.9525E−02 | −1.1651E−02 | 1.0231E−02 | 2.5980E−03 | −1.6711E−03 | 4.8433E−04 |
| S11 | −1.8847E−01 | 8.2177E−02 | −1.8614E−02 | −3.3866E−05 | 1.7855E−03 | −7.1945E−04 | 1.6251E−04 |
| S12 | −1.8132E−01 | 9.9294E−02 | −4.5193E−02 | 1.5977E−02 | −4.2579E−03 | 8.4550E−04 | −1.2471E−04 |

TABLE 8-2

| Surface number | A18 | A20 | A22 | A24 | A26 | A28 | A30 |
|---|---|---|---|---|---|---|---|
| S1 | 6.4507E+00 | −4.3453E+00 | 2.0878E+00 | −6.9869E−01 | 1.5498E−01 | −2.0531E−02 | 1.2338E−03 |
| S2 | −1.0750E+02 | 9.3649E+01 | −5.8223E+01 | 2.5186E+01 | −7.1979E+00 | 1.2211E+00 | −9.3069E−02 |
| S3 | 1.3983E+02 | −1.2643E+02 | 8.1391E+01 | −3.6397E+01 | 1.0743E+01 | −1.8818E+00 | 1.4812E−01 |
| S4 | 2.7474E+02 | −3.2461E+02 | 2.7427E+02 | −1.6129E+02 | 6.2627E+01 | −1.4420E+01 | 1.4901E+00 |
| S5 | 1.7453E+02 | −1.5143E+02 | 9.4165E+01 | −4.0831E+01 | 1.1698E+01 | −1.9856E+00 | 1.5080E−01 |
| S6 | 1.7577E+01 | −1.2371E+01 | 6.2524E+00 | −2.1990E+01 | 5.0859E−01 | −6.9202E−02 | 4.1761E−03 |
| S7 | 6.3941E+00 | −3.9565E+00 | 1.7826E+00 | −5.6853E−01 | 1.2150E−01 | −1.5584E−02 | 9.0522E−04 |
| S8 | 1.0275E−01 | −3.3902E−02 | 7.7622E−03 | −1.1865E−03 | 1.1294E−04 | −5.8106E−06 | 1.1167E−07 |
| S9 | −5.1851E−03 | 1.4463E−03 | −2.7651E−04 | 3.5617E−05 | −2.9522E−06 | 1.4215E−07 | −3.0222E−09 |
| S10 | −8.5001E−05 | 1.2836E−05 | −2.3096E−06 | 3.7380E−07 | −3.8998E−08 | 2.2240E−09 | −5.3004E−11 |
| S11 | −2.4300E−05 | 2.5214E−06 | −1.8325E−07 | 9.1811E−09 | −3.0277E−10 | 5.9248E−12 | −5.2185E−14 |
| S12 | 1.3625E−05 | −1.0945E−06 | 6.3633E−08 | −2.5993E−09 | 7.0638E−11 | −1.1453E−12 | 8.3766E−15 |

As shown in FIGS. 6A-6C, the optical imaging lens assembly 3001, the optical imaging lens assembly 3002 and the optical imaging lens assembly 3003 have a plurality of spacing elements including a first spacing element P1, a second spacing element P2, a third spacing element P3, a fourth spacing element P4 and a fifth spacing element P5 respectively. Here, the first spacing element P1 is disposed between the first lens E1 and the second lens E2 and in contact with the image-side surface of the first lens E1; the second spacing element P2 is disposed between the second lens E2 and the third lens E3 and in contact with the image-side surface of the second lens E2; the third spacing element P3 is disposed between the third lens E3 and the fourth lens E4 and in contact with the image-side surface of the third lens E3; the fourth spacing element P4 is disposed between the fourth lens E4 and the fifth lens E5 and in contact with the image-side surface of the fourth lens E4; and the fifth spacing element P5 is disposed between the fifth lens E5 and the sixth lens E6 and in contact with the image-side surface of the fifth lens E5.

The above plurality of spacing elements may block the entry of excess external light, so that the lenses and the lens barrel are better supported, and a structural stability of the optical imaging lens assembly 3001, the optical imaging lens assembly 3002 and the optical imaging lens assembly 3003 is enhanced.

Table 9 shows basic parameters of the spacing elements and the lens barrel of the optical imaging lens assembly 3001, the optical imaging lens assembly 3002 and the optical imaging lens assembly 3003 in Embodiment 3. The units of the parameters in Table 9 are millimeters (mm).

TABLE 9

| Embodiment parameter | Optical imaging lens assembly 3001 | Optical imaging lens assembly 3002 | Optical imaging lens assembly 3003 |
|---|---|---|---|
| d1s | 2.6028 | 2.5575 | 2.7411 |
| D1s | 4.2150 | 4.2536 | 4.2719 |
| d2s | 2.4042 | 2.2777 | 2.4551 |
| d2m | 2.4042 | 2.2777 | 2.4551 |
| d3s | 2.9178 | 2.9949 | 2.9572 |
| d3m | 2.9178 | 2.9949 | 2.9572 |
| D3m | 6.7114 | 6.6357 | 5.7607 |
| d4s | 4.0758 | 4.2276 | 3.8447 |
| d4m | 4.0758 | 4.2276 | 3.8447 |
| d0s | 5.0452 | 4.9417 | 4.5251 |
| d0m | 11.8837 | 11.9057 | 11.2018 |
| CP1 | 0.0241 | 0.0299 | 0.0301 |
| EP12 | 0.4520 | 0.4463 | 0.4168 |
| CP2 | 0.0221 | 0.0304 | 0.0296 |
| EP23 | 0.3837 | 0.3754 | 0.4229 |
| CP3 | 0.0361 | 0.0466 | 0.0350 |
| EP34 | 0.6291 | 0.6185 | 0.6170 |
| CP4 | 0.0342 | 0.0551 | 0.0454 |
| EP45 | 0.4219 | 0.4293 | 0.4664 |
| CP5 | 0.5825 | 0.5541 | 0.4809 |
| EP01 | 0.9487 | 0.8858 | 0.8427 |

Figure 7C:
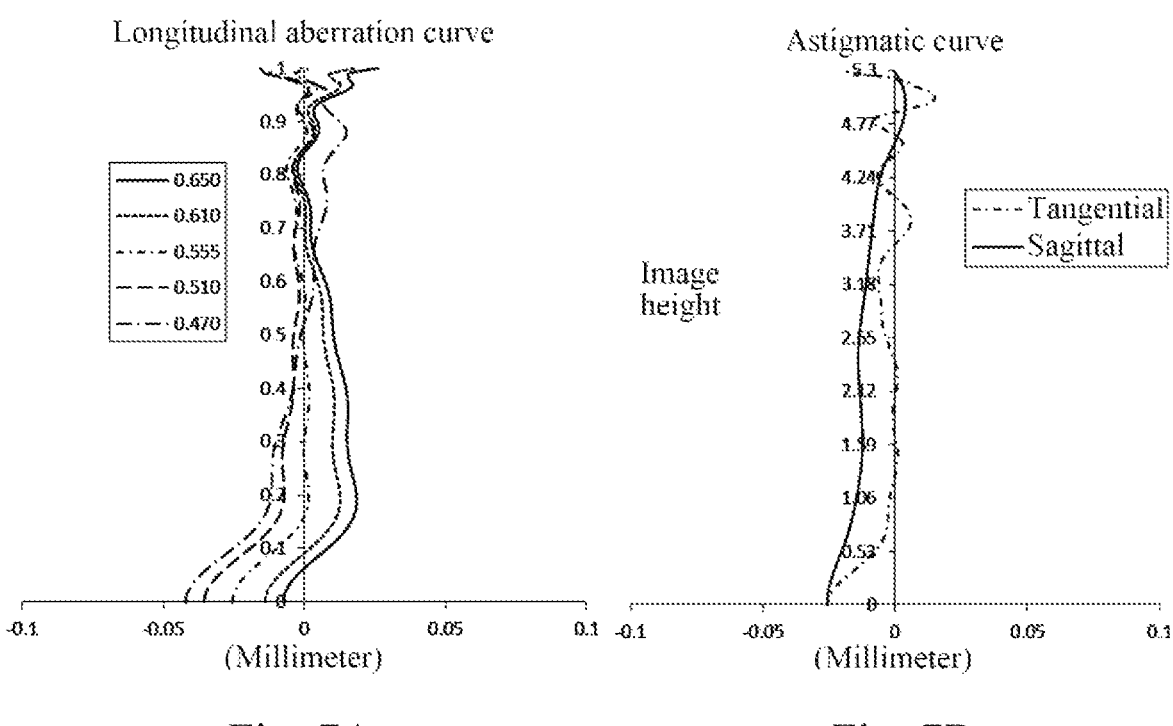
Figure 7C:
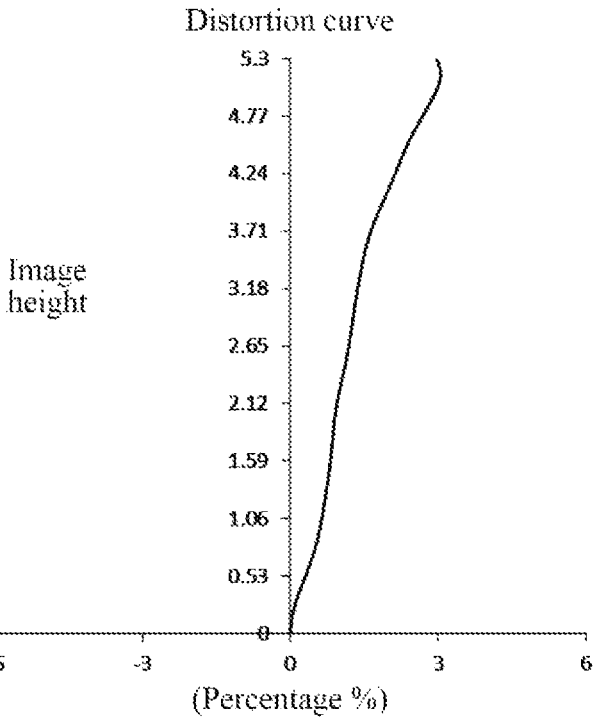

FIG. 7A illustrates a longitudinal aberration curve of the optical imaging lens assembly 3001, the optical imaging lens assembly 3002 and the optical imaging lens assembly 3003 according to Embodiment 3, representing deviations of focal points of light of different wavelengths converged after passing through the lens assembly. 713 illustrates an astigmatic curve of the optical imaging lens assembly 3001, the optical imaging lens assembly 3002 and the optical imaging lens assembly 3003 according to Embodiment 3, representing a curvature of a tangential image plane and a curvature of a sagittal image plane. FIG. 7C illustrates a distortion curve of the optical imaging lens assembly 3001, the optical imaging lens assembly 3002 and the optical imaging lens assembly 3003 in Embodiment 3, representing amounts of distortion corresponding to different image heights. It can be seen from FIGS. 7A-7C that the optical imaging lens assembly 3001, the optical imaging lens assembly 3002 and the optical imaging lens assembly 3003 given in Embodiment 3 can achieve a good imaging quality.

In summary, the optical imaging lens assemblies 1001, 1002, 1003, 2001, 2002, 2003, 3001, 3002, and 3003 in Embodiment 1 to Embodiment 3 satisfy the relationships shown in Table 10.

TABLE 10

| Conditional expression/embodiment | 1001 | 1002 | 1003 | 2001 | 2002 | 2003 | 3001 | 3002 | 3003 |
|---|---|---|---|---|---|---|---|---|---|
| f/(CP1 + EP23 + CP5) | 5.38 | 5.57 | 5.79 | 10.13 | 9.68 | 9.58 | 5.55 | 5.73 | 5.89 |
| (d1s × D1s)/(CT1 × T12) | 130.45 | 127.18 | 142.35 | 146.66 | 142.95 | 147.38 | 127.38 | 126.31 | 135.96 |
| (CT2 + T23)/EP12 | 1.69 | 1.69 | 1.34 | 1.53 | 1.50 | 1.46 | 1.60 | 1.62 | 1.73 |
| \|f2 × R4\|/(d2s × d2m) | 20.12 | 20.93 | 19.85 | 20.55 | 22.16 | 23.93 | 17.14 | 19.10 | 16.44 |
| \|f4\|/(CP3 + EP34) | 13.35 | 13.35 | 12.82 | 18.73 | 18.73 | 18.73 | 28.23 | 28.24 | 28.80 |
| \|R6 + R7\|/(d3m + D3m) | 7.13 | 7.13 | 7.47 | 1.63 | 1.63 | 1.73 | 15.98 | 15.97 | 17.65 |
| (d4s + d4m)/T45 | 26.90 | 27.13 | 26.08 | 40.74 | 39.83 | 44.87 | 17.93 | 18.60 | 16.91 |
| f5/EP45 | 9.46 | 9.57 | 8.80 | 10.12 | 10.23 | 10.39 | 10.91 | 10.72 | 9.87 |
| (d0s + d0m)/f | 2.87 | 2.84 | 2.87 | 3.19 | 3.13 | 3.10 | 3.08 | 3.06 | 2.86 |
| \|f1 + f2\|/EP01 | 12.87 | 12.57 | 13.33 | 12.99 | 13.31 | 14.18 | 12.10 | 12.96 | 13.62 |

The present disclosure further provides an imaging apparatus having an electronic photosensitive element which may be a photosensitive charge-coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combination of the above technical features or equivalent features thereof without departing from the concept of the invention, for example, technical solutions formed by replacing the features as disclosed in the present disclosure with (but not limited to) technical features with similar functions.

What is claimed is:
1. An optical imaging lens assembly, comprising:
an imaging lens group, consisting of a first lens, a second lens, a third lens, a fourth lens, a fifth lens and a sixth lens arranged in sequence from an object side to an image side along an optical axis, wherein the sixth lens has at least one inflection point on an image-side surface;
a plurality of spacing elements, comprising a first spacing element disposed between the first lens and the second lens and in contact with an image-side surface of the first lens, a second spacing element disposed between the second lens and the third lens and in contact with an image-side surface of the second lens, a third spacing element disposed between the third lens and the fourth lens and in contact with an image-side surface of the third lens, and a fifth spacing element disposed between the fifth lens and the sixth lens and in contact with an image-side surface of the fifth lens; and
a lens barrel, for accommodating the imaging lens group and the plurality of spacing elements;
wherein an effective focal length f2 of the second lens, an radius of curvature R4 of the image-side surface of the second lens, an inner diameter d2s of an object-side surface of the second spacing element and an inner diameter d2m of an image-side surface of the second spacing element satisfy: $16 < |f2 \times R4|/(d2s \times d2m) < 24$,
wherein the plurality of spacing elements further comprise a fourth spacing element disposed between the fourth lens and the fifth lens and in contact with an image-side surface of the fourth lens,
wherein an effective focal length f4 of the fourth lens, a maximum thickness CP3 of the third spacing element along the direction of the optical axis, and a spacing EP34 between an image-side surface of the third spacing element and an object-side surface of the fourth spacing element along the direction of the optical axis satisfy: $12 < |f4|/(CP3 + EP34) < 29$.

2. The optical imaging lens assembly according to claim 1, wherein an inner diameter d1s of an object-side surface of the first spacing element, an outer diameter D1s of the object-side surface of the first spacing element, a center thickness CT1 of the first lens on the optical axis, and an air spacing T12 between the first lens and the second lens on the optical axis satisfy: $126 < (d1s \times D1s)/(CT1 \times T12) < 148$.

3. The optical imaging lens assembly according to claim 1, wherein a center thickness CT2 of the second lens on the optical axis, an air spacing T23 between the second lens and the third lens on the optical axis, and a spacing EP12 between an image-side surface of the first spacing element and the object-side surface of the second spacing element along the direction of the optical axis satisfy: $0.5 < (CT2 + T23)/EP12 < 3.5$.

4. The optical imaging lens assembly according to claim 1,
wherein the inner diameter d2s of the object-side surface of the second spacing element, an inner diameter d3s of an object-side surface of the third spacing element and an inner diameter d4s of the object-side surface of the fourth spacing element satisfy: $d2s < d3s < d4s$.

5. The optical imaging lens assembly according to claim 1, wherein at least two lenses of all lenses having an Abbe number greater than 40 in the imaging lens group have positive refractive powers.

6. The optical imaging lens assembly according to claim 1, wherein at least one lens in the fourth lens to the sixth lens is a meniscus lens.

7. The optical imaging lens assembly according to claim 1, wherein a radius of curvature R1 of an object-side surface of the first lens, a radius of curvature R2 of the image-side surface of the first lens, a radius of curvature R3 of an object-side surface of the second lens and the radius of curvature R4 of the image-side surface of the second lens satisfy: R2>R1 and R3>R4.

8. The optical imaging lens assembly according to claim 1, wherein an effective focal length f of the optical imaging lens assembly, a maximum thickness CP1 of the first spacing element along a direction of the optical axis, a spacing EP23 between the image-side surface of the second spacing element and an object-side surface of the third spacing element along the direction of the optical axis and a maximum thickness CP5 of the fifth spacing element along the direction of the optical axis satisfy: 5<f/(CP1+EP23+CP5)<11.

9. The optical imaging lens assembly according to claim 1, wherein a radius of curvature R6 of the image-side surface of the third lens, a radius of curvature R7 of an object-side surface of the fourth lens, an inner diameter d3m of the image-side surface of the third spacing element and an outer diameter D3m of the image-side surface of the third spacing element satisfy: 1<|R6+R7|/(d3m+D3m)<18.

10. The optical imaging lens assembly according to claim 1, wherein a maximum thickness of the fifth spacing element along the direction of the optical axis is greater than maximum thicknesses of other spacing elements in the plurality of spacing elements along the direction of the optical axis.

11. The optical imaging lens assembly according to claim 1,
wherein an inner diameter d4s of the object-side surface of the fourth spacing element, an inner diameter d4m of an image-side surface of the fourth spacing element, an air spacing T45 between the fourth lens and the fifth lens on the optical axis satisfy:
16< (d4s+d4m)/T45<45.

12. The optical imaging lens assembly according to claim 1,
wherein an effective focal length f5 of the fifth lens and a spacing EP45 between an image-side surface of the fourth spacing element and an object-side surface of the fifth spacing element along the direction of the optical axis satisfy: 8<f5/EP45<11.

13. The optical imaging lens assembly according to claim 1, wherein an inner diameter d0s of a front end surface of the lens barrel close to the object side, an inner diameter d0m of a rear end surface of the lens barrel close to the image side and an effective focal length f of the optical imaging lens assembly satisfy: 1< (d0s+d0m)/f<5.

14. The optical imaging lens assembly according to claim 1, wherein an effective focal length f1 of the first lens, the effective focal length f2 of the second lens, and a spacing EP01 between a front end surface of the lens barrel close to the object side and an object-side surface of the first spacing element along the direction of the optical axis satisfy: 11<|f1+f2|/EP01<16.

15. An optical imaging lens assembly, comprising:
an imaging lens group, consisting of a first lens, a second lens, a third lens, a fourth lens, a fifth lens and a sixth lens arranged in sequence from an object side to an image side along an optical axis, wherein the sixth lens has at least one inflection point on an image-side surface;
a plurality of spacing elements, comprising a first spacing element disposed between the first lens and the second lens and in contact with an image-side surface of the first lens, a second spacing element disposed between the second lens and the third lens and in contact with an image-side surface of the second lens, a third spacing element disposed between the third lens and the fourth lens and in contact with an image-side surface of the third lens, and a fifth spacing element disposed between the fifth lens and the sixth lens and in contact with an image-side surface of the fifth lens; and
a lens barrel, for accommodating the imaging lens group and the plurality of spacing elements;
wherein an effective focal length f2 of the second lens, an radius of curvature R4 of the image-side surface of the second lens, an inner diameter d2s of an object-side surface of the second spacing element and an inner diameter d2m of an image-side surface of the second spacing element satisfy: 16<|f2×R4|/(d2s×d2m)<24,
wherein the plurality of spacing elements further comprise a fourth spacing element disposed between the fourth lens and the fifth lens and in contact with an image-side surface of the fourth lens,
wherein an effective focal length f5 of the fifth lens and a spacing EP45 between an image-side surface of the fourth spacing element and an object-side surface of the fifth spacing element along the direction of the optical axis satisfy: 8<f5/EP45<11.

* * * * *